(12) United States Patent
Choi et al.

(10) Patent No.: US 11,178,614 B2
(45) Date of Patent: Nov. 16, 2021

(54) ELECTRONIC DEVICE AND METHOD OF CONTROLLING POWER IN ELECTRONIC DEVICE

(71) Applicant: Samsung Electronics Co., Ltd., Gyeonggi-do (KR)

(72) Inventors: Won-Jin Choi, Gyeongsangbuk-do (KR); Dong-Ju Lee, Daegu (KR); Bong-Sup Son, Daegu (KR); Seok-Kun Hyung, Gyeongsangbuk-do (KR); Ji-Woo Lee, Gyeongsangbuk-do (KR)

(73) Assignee: Samsung Electronics Co., Ltd

( * ) Notice: Subject to any disclaimer, the term of this patent is extended or adjusted under 35 U.S.C. 154(b) by 52 days.

(21) Appl. No.: 16/191,025

(22) Filed: Nov. 14, 2018

(65) Prior Publication Data

US 2019/0159129 A1      May 23, 2019

(30) Foreign Application Priority Data

Nov. 17, 2017 (KR) ......................... 10-2017-0154028

(51) Int. Cl.
*H04W 52/02* (2009.01)
*H04W 52/42* (2009.01)
(Continued)

(52) U.S. Cl.
CPC .......... *H04W 52/0229* (2013.01); *H04B 1/40* (2013.01); *H04W 52/42* (2013.01); *H04W 52/52* (2013.01)

(58) Field of Classification Search
CPC . H04W 52/0229; H04W 53/42; H04W 53/52; H04W 4/21; H04W 4/80;
(Continued)

(56) References Cited

U.S. PATENT DOCUMENTS 5,524,044 A * 6/1996 Takeda ................. H04B 1/3833
455/571
5,898,908 A * 4/1999 Griffin ................. H04B 1/3877
343/702
(Continued)

FOREIGN PATENT DOCUMENTS

EP      0 869 577      10/1998
EP      1 063 790      12/2000

OTHER PUBLICATIONS

International Search Report dated Dec. 12, 2018 issued in counterpart application No. PCT/KR2018/010838, 10 pages.
(Continued)

*Primary Examiner* — Yuwen Pan
*Assistant Examiner* — Paul P Tran
(74) *Attorney, Agent, or Firm* — The Farrell Law Firm, P.C.

(57) ABSTRACT

An electronic device includes a housing; a first antenna located at a first part of the housing; a second antenna located at a second part separated from the first part of the housing; a transceiver configured to generate a first signal and a second signal; a first coupler electrically connected between the first antenna and the transceiver and configured to receive the first signal from the transceiver and provide the received first signal to the first antenna; a second coupler electrically connected to the second antenna and the transceiver and configured to receive the second signal from the transceiver and provide the received second signal to the second antenna; and a control circuit operationally connected to the transceiver, wherein the control circuit is
(Continued)

configured to determine at least one value related to gains of the first signal and the second signal based at least partially on the signals provided from the first coupler and the second coupler, determine whether the first signal has a higher gain than that of the second signal, and allow the first signal to have increased transmission power and the second signal to have reduced transmission power based at least partially on the at least one value related to the gains.

19 Claims, 17 Drawing Sheets

(51) Int. Cl.
*H04W 52/52* (2009.01)
*H04B 1/40* (2015.01)

(58) Field of Classification Search
CPC ....... H04W 8/24; H04W 16/14; H04W 48/10; H04W 48/16; H04W 52/00229; H04W 52/146; H04W 52/16; H04W 52/325; H04W 52/34; H04W 52/367; H04W 52/383; H04W 52/40; H04W 52/42; H04W 52/52; H04W 72/0413; H04W 76/14; H04W 76/15; H04W 88/06; H04W 24/00; H04B 1/40; H04B 1/0057; H04B 1/006; H04B 1/0078; H04B 1/0082; H04B 1/30; H04B 1/401; H04B 1/406; H04B 1/44; H04B 17/14; H04B 17/19; H04B 17/318; H04B 1/0483; H04B 7/04; H04B 7/0691; H04B 7/0874; H04B 7/15507; H04B 17/12; H04B 17/13; H04B 17/21; H04L 5/001; H04L 61/6022; H03F 3/24; H03F 3/602
See application file for complete search history.

(56) References Cited

U.S. PATENT DOCUMENTS

| | | | | |
|---|---|---|---|---|
| 6,636,495 | B1* | 10/2003 | Tangemann | H01Q 1/246 370/332 |
| 6,798,843 | B1* | 9/2004 | Wright | H03F 1/3241 330/149 |
| 2004/0198261 | A1* | 10/2004 | Xiong | H04W 52/50 455/115.1 |
| 2005/0207509 | A1* | 9/2005 | Saunders | H04B 1/525 375/285 |
| 2007/0222609 | A1* | 9/2007 | Duron | G06K 7/0008 340/572.7 |
| 2012/0302282 | A1 | 11/2012 | Pascolini | |
| 2013/0127597 | A1 | 5/2013 | Ovard et al. | |
| 2013/0260844 | A1 | 10/2013 | Rucki et al. | |
| 2013/0336415 | A1* | 12/2013 | Hung | H04B 1/40 375/267 |
| 2014/0241378 | A1 | 8/2014 | Vanderhaegen et al. | |
| 2015/0071335 | A1* | 3/2015 | Breslin | H04B 17/318 375/227 |
| 2016/0073394 | A1* | 3/2016 | Kim | H04L 5/0055 370/329 |
| 2016/0192297 | A1 | 6/2016 | Kim et al. | |
| 2016/0234794 | A1* | 8/2016 | Xu | H04W 52/346 |
| 2016/0308626 | A1* | 10/2016 | Mow | H04B 17/14 |
| 2016/0323833 | A1* | 11/2016 | Zhang | H04W 52/146 |
| 2017/0070246 | A1 | 3/2017 | Natesan et al. | |
| 2017/0257135 | A1* | 9/2017 | Solomko | H04B 1/401 |
| 2018/0132190 | A1* | 5/2018 | Jeon | H04W 72/12 |
| 2019/0182779 | A1* | 6/2019 | Niu | H01Q 1/247 |

OTHER PUBLICATIONS

European Search Report dated Jul. 7, 2020 issued in counterpart application No. 18878220.5-1220, 8 pages.

* cited by examiner

ELECTRONIC DEVICE AND METHOD OF CONTROLLING POWER IN ELECTRONIC DEVICE

CROSS-REFERENCE TO RELATED APPLICATION

This application claims the priority under 35 U.S.C. § 119(a) to Korean Patent Application Serial No. 10-2017-0154028, filed on Nov. 17, 2017 in the Korean Intellectual Property Office, the disclosure of which is hereby incorporated by reference in its entirety.

BACKGROUND

1. Field

The present disclosure relates generally to a method of controlling transmission power transmitted through an antenna in an electronic device.

2. Description of Related Art

In order to meet wireless data traffic demands, which have increased since the commercialization of $4^{th}$ generation (4G) communication systems, efforts to develop an improved 5th generation (5G) communication system or a pre-5G communication system have been made. For this reason, the 5G communication system or the pre-5G communication system is called a beyond-4G-network communication system or a post-long term evolution (LTE) system.

Methods using multiple antennas have been researched for improving transmission/reception data efficiency in a wireless communication system. For example, multiple-input multiple-output (MIMO) technology is a method for improving transmission/reception data efficiency by adopting multiple transmission antennas and multiple reception antennas, as opposed to using a single transmission antenna and a single reception antenna. A multi-antenna system may include a spatial-diversity-based scheme that acquires a diversity gain by simultaneously transmitting the same data to a plurality of transmission antennas, thereby increasing transmission reliability. A multi-antenna system may also include a spatial multiplexing scheme that simultaneously transmits a plurality of data symbols through a plurality of different antennas, thereby increasing a transmission rate.

For example, in order to simultaneously output the same primary carrier component (PCC) signals in a transmission (Tx) diversity system in which an electronic device (i.e., a user equipment (UE)) outputs the same PCC signals through a plurality of antennas, it may be necessary to control a plurality of power amplifiers. In the system in which the same PCC signals are output using the plurality of antennas, power consumption may increase compared to a system using a single transmission antenna.

SUMMARY

The present disclosure has been made to address the above-mentioned problems and disadvantages, and to provide at least the advantages described below.

Accordingly, an aspect of the present disclosure provides an electronic device and a method of controlling transmission diversity power by an electronic device capable of differentially controlling transmission power through a plurality of power amplifiers for amplifying signals transmitted to respective antennas in a transmission diversity system in which the same PCC signals are output through a plurality of antennas.

In accordance with an aspect of the present disclosure, an electronic device is provided. The electronic device includes a housing; a first antenna located at a first part of the housing; a second antenna located at a second part separated from the first part of the housing; a transceiver configured to generate a first signal and a second signal; a first coupler electrically connected between the first antenna and the transceiver and configured to receive the first signal from the transceiver and provide the received first signal to the first antenna; a second coupler electrically connected to the second antenna and to the transceiver and configured to receive the second signal from the transceiver and provide the received second signal to the second antenna; and a control circuit operationally connected to the transceiver, wherein the control circuit is configured to determine at least one value related to gains of the first signal and the second signal based at least partially on the signals provided from the first coupler and the second coupler, determine whether the first signal has a higher gain than that of the second signal, and allow the first signal to have increased transmission power and the second signal to have reduced transmission power based at least partially on the at least one value related to the gains.

In accordance with another aspect of the present disclosure, a method of controlling transmission diversity power by an electronic device is provided. The method includes receiving a first signal from a transceiver and providing the received first signal to a first antenna by a first coupler electrically connected between the first antenna and the transceiver; receiving a second signal from the transceiver and providing the received second signal to a second antenna by a second coupler electrically connected between the second antenna and the transceiver; receiving fed back signals from the first coupler and the second coupler; determining at least one value related to gains of the first signal and the second signal based at least partially on the fed back signals; determining whether the first signal has a higher gain than that of the second signal; and performing control to allow the first signal to have increased transmission power and the second signal to have reduced transmission power based at least partially on the at least one value related to the gains.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
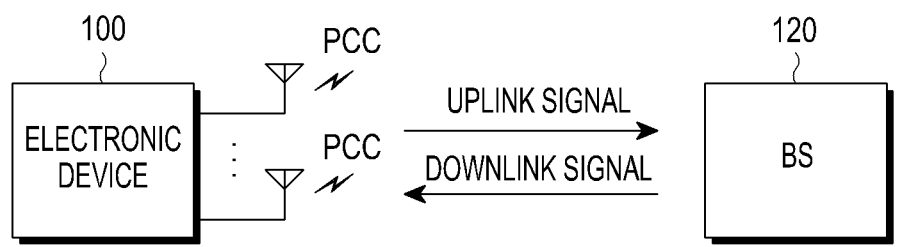
FIG. 1 illustrates a network environment providing transmission diversity, according to an embodiment.

An electronic device and a method of controlling transmission diversity power by an electronic device may advantageously reduce power consumption of the electronic device and increase antenna efficiency, which is reduced due to the influence of the surrounding environment, by differentially controlling transmission power of signals transmitted through a plurality of antennas when controlling transmission power of uplink signals, which an electronic device (for example, a UE) transmits to a BS.

Various embodiments are described with reference to the accompanying drawings. However, the various embodiments are not limited to particular embodiments, and it should be understood that modifications, equivalents, and/or alternatives of the embodiments described herein can be variously made. With regard to description of the drawings, similar reference numerals may be used to designate similar constituent elements.

As used herein, singular forms may include plural forms unless the context clearly indicates otherwise. Expressions such as, "a first", "a second", "the first", or "the second", may modify various components regardless of the order and/or the importance but do not limit the corresponding components. When an element (e.g., a first element) is referred to, with or without the term "operatively" or "communicatively", as "coupled with", "coupled to", or "connected to" another element (e.g., a second element), it means that the element may be coupled with the other element directly (e.g., wiredly), wirelessly, or via a third element.

As used herein, the expression "configured to" may be interchangeably used with the expressions "suitable for", "having the capacity to", "designed to", "adapted to", "made to", or "capable of". Alternatively, in some situations, the expression "device configured to" may mean that the device, together with other devices or components, "is able to". For example, the phrase "processor adapted to perform A, B, and C" (i.e., a processor configured to perform A, B, and C) may mean a dedicated processor (e.g., an embedded processor) only for performing the corresponding operations or a generic-purpose processor (e.g., a central processing unit (CPU) or an application processor (AP)) that can perform the corresponding operations by executing one or more software programs stored in a memory device.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

An electronic device may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a Motion Picture Experts Group (MPEG)-1 audio layer-3 (MP3) player, a mobile medical device, a camera, and a wearable device (i.e., a head mounted device (HMD)). The wearable device may include at least one of an accessory type device (e.g., a watch, a ring, a bracelet, an ankle bracelet, a necklace, a pair of glasses, contact lenses, or a head mounted display (HMD)), a fabric or clothing integrated device (e.g., electronic clothing), a body attachment device (e.g., a skin pad or tattoo), and a bio-implantable circuit. In some embodiments, the electronic device may include at least one of, for example, a television, a digital video disk (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices, such as various portable medical measuring devices (i.e., a blood glucose monitoring device, a heart rate monitoring device, a blood pressure measuring device, or a body temperature measuring device), a magnetic resonance angiography (MRA) device, a magnetic resonance imaging (MRI) device, a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship and a gyro-compass), an avionics device, security devices, an automotive head unit, a robot for home or industry use, an automatic teller's machine (ATM), point of sales (POS) device, or an Internet of things (IoT) device (e.g., a light bulb, various sensors, electric or gas meter, a sprinkler device, a fire alarm, a thermostat, a streetlamp, a toaster, a sporting goods device, a hot water tank, a heater, or a boiler).

Additionally, the electronic device may include at least one of a part of furniture or a building/structure, an electronic board, an electronic signature receiving device, a projector, and various types of measuring instruments (e.g., a water meter, an electric meter, a gas meter, and a radio wave meter).

According to an embodiment, the electronic device may be a combination of two or more of the aforementioned various devices, or the electronic device may also be a flexible device. Further, the electronic device is not limited to the aforementioned devices, and may include a new electronic device according to technological developments.

Various embodiments of the present disclosure are directed to an electronic device capable of differentially controlling transmission power through a plurality of power amplifiers that amplify signals transmitted to respective antennas and a method of controlling transmission diversity power by the electronic device in a transmission diversity system for outputting the same signals (for example, the same PCC signals) through a plurality of antennas.

Although an electronic device is referred to as a UE for convenience of description, the UE used in the embodiments may include various types of electronic devices and may be replaced with various types of electronic devices.

Further, various embodiments are implemented over an LTE wireless communication network, but the various embodiments are not limited to a particular network type. For example, the wireless communication network is, for example, a cellular communication protocol and may include at least one of LTE, LTE-advanced (LTE-A), code division multiple access (CDMA), wireless CDMA (WCDMA), universal mobile telecommunications service (UMTS), wireless broadband (WiBro), and global system for mobile communications (GSM). Further, the wireless communication network may include various communication networks such as a personal area network (PAN), a local area network (LAN), a metropolitan area network (MAN), and a wide area network (WAN). In addition, the wireless communication network may be the World Wide Web (WWW), and may use wireless transmission technology utilized for short-distance communication, such as Infrared Data Association (IrDA) or Bluetooth.

The wireless communication network may be a specific node of the wireless communication network, such as a BS of the wireless communication network, a subscriber information management node, or a mobility management node.

The wireless communication network may include a home location register (HLR) that the UE accesses to perform a subscriber authentication function, an authentication center (AuC) server, and a network and a server that the UE accesses after authentication to provide voice communication or data communication.

The term "user equipment" (i.e., "UE") may refer to a mobile station (MS), a terminal, a user terminal (UT), a wireless terminal, an access terminal (AT), a subscriber unit, a subscriber station (SS), a wireless device, a wireless communication device, a wireless transmit/receive unit (WTRU), a mobile node, mobile, or other terms. Various embodiments of the UE may include a cellular phone, a smart phone having a wireless communication function, a tablet having a wireless communication function, a wearable device having a wireless communication function, a personal digital assistant (PDA) having a wireless communication function, a wireless modem, a portable computer having a wireless communication function, a photographing device such as a digital camera having a wireless communication function, a gaming device having a wireless communication function, home appliances for storing and/or playing music having a wireless communication function, Internet home appliances capable of performing wireless Internet access and browsing, and portable units or UEs having a combination of the functions. Further, the UE may include a measuring instrument including a communication function.

Further, in this specification, the UE may include, but is not limited to, a machine-to-machine (M2M) terminal and a machine-type communication (MTC) terminal/device.

In addition, the specific terms used in present disclosure may include at least some functions defined in relevant standards documents (for example, LTE-related standards documents), and may further include functions performed in various embodiments in addition to the functions defined in the standards documents.

FIG. 1 illustrates a network environment providing transmission diversity, according to an embodiment.

Referring to FIG. 1, a network includes an electronic device 100 (for example, the UE) and a BS 120.

The electronic device 100 may include a plurality of antennas, and the plurality of antennas may transmit similar signals (i.e., the same signal) or different signals. The plurality of antennas of the electronic device 100 may transmit PPC signals of the same frequency to the BS 120, and the electronic device or the network including the electronic device may be referred to as a Tx diversity system.

The signal transmitted from the electronic device 100 to the BS 120 may be referred to as an uplink signal, and the signal transmitted from the BS 120 to the electronic device 100 may be referred to as a downlink signal. Various embodiments may provide a differential power control (i.e., differential transmit power control) method by which the electronic device 100 including the plurality of antennas may differentially provide transmission power of uplink signals transmitted through respective antennas. It is possible to perform control to reduce power consumption of the electronic device or minimize power consumption by differentially controlling transmission power of uplink signals in the network system.

According to an embodiment, the electronic device 100 may transmit the same PCC signals to the BS 120 by forming one transmission beam through a plurality of antennas and control power of the transmission beam according to information related to target transmission power (i.e., target transmit power) received from the BS 120. The target transmit power may be calculated through a transmission power parameter received from the BS 120.

The electronic device 100 may provide a transmission diversity system in which one transmission beam is generated in accordance with information related to target transmission power received from the BS 120.

In the transmission diversity system, a first Tx antenna and a second Tx antenna of the electronic device 100 may output transmission signals with the same reference transmission power (i.e., reference transmit power). The electronic device 100 may measure in-phase/quadrature-phase (I/Q) values of transmission signals fed back (or reflected) through couplers connected to the first antenna and the second antenna. For example, changes in magnitude and phase of signals may be identified using I/Q values of the signals. When a plurality of transmission antennas have the same gain condition, the reference transmission power may be the same transmission power output through respective transmission antennas in order to meet the target transmission power.

For example, the target transmission power may be calculated based on Equation (1) below.

$$\text{Target transmission power [mW]} = 10 * \log_{10}(\text{first antenna transmission power [dBm]} + \text{second antenna transmission power [dBm]}) \quad (1)$$

In Equation (1), when it is assumed that a plurality of transmission antennas output the same transmission power, the transmission power of the first antenna and the transmission power of the second antenna may have the same reference transmission power.

A mapping table may be used, which includes an index value, a target antenna gain value, a magnitude value of the transmission signal output from the target antenna (for example, the first antenna or the second antenna), and a phase value in accordance with the fed back I/Q value received from the coupler connected to each antenna. An antenna gain difference value may be determined according to a target antenna gain value before a change in impedance in each antenna and a target antenna gain value after a change in impedance in each antenna.

According to an embodiment, it is possible to perform differential power control based on an antenna gain difference between an antenna having a relatively good gain condition (referred to as a "good antenna") and an antenna having a relatively bad gain condition (referred to as a "bad antenna") among a plurality of antennas that provide transmission diversity to the electronic device 100.

When transmission power (for example, when transmission power higher than a reference transmission power) of the good antenna reflecting the antenna gain difference value is determined, a transmission power of the bad antenna may be determined using Equation (1) above.

The target transmission power in the LTE system may be calculated through Equation (2), below, based on the transmission power parameter received from the BS 120.

$$P_{PUSCH}(i) = \min\{P_{MAX}, 10*\log_{10}(M_{PUSCH}(i)) + P_{oPUSCH}(j) + \alpha(j) \cdot PL + \Delta_{MCS}(i) + f(i)\}[dBm] \quad (2)$$

For example, the BS 120 may transmit a common default transmission power parameter regardless of the capabilities of all electronic devices accessing a cell before capacity negotiation with the electronic device 100. The electronic device 100 may receive the default transmission power parameter from the BS 120 and calculate a transmission power through Equation (2) based on the received parameter. The target power calculated using the transmission power parameter may be referred to as target transmission power.

In Equation (2), "$P_{MAX}$" denotes an allowed maximum power value, and may be determined in a manner dependent on elements such as "UE Power Class", "Cell-specific Power Limits", and "Possible Power Reductions and Tolerances". For example, when transmission of an $i^{th}$ subframe is equal to or lower than $P_{MAX}$, the electronic device 100 may determine transmission power based on a $P_{PUSCH}$ determined by various transmission power parameters included in Equation (2).

In Equation (2), "$P_{O\_PUSCH}$" denotes power related to a signal-to-interference-plus-noise ratio (SINR) of the received signal, and may be a user-specific parameter. The $P_{O\_PUSCH}$ may be received from the BS 120 through a broadcasting control channel such as a master information block (MIB) or a system information block (SIB), and may be differently configured according to the electronic device 100 through radio resource control (RRC) signaling. In Equation (2), "$\log_{10}(M_{PUSCH}(i))$" denotes the log value of an allocated resource block number. "PL" denotes a path loss and "$\alpha(j)$" denotes a weighted value for compensating for a path loss according to a uplink (UL) grant scheme, and "j" may have a value of 0, 1, or 2. "$\Delta_{MCS}(i)$" denotes a power offset derived from a modulation and coding scheme (MCS)-based transmission format, and may be generated during an RRC signaling process. "f(i)" denotes a value obtained from a transmit power control (TPC) command, and the TPC command may vary depending on downlink control information (DCI) Format 0/3/4 and DCI Format 3A.

In the transmission diversity system, a plurality of power amplifiers may be controlled to simultaneously output the same PCC signals through a plurality of antennas included in the electronic device 100.

Table 1, below, is a table in which current consumption is compared when the same target transmission power (for example, 23 dBm) is output between a signal transmission antenna system and a transmission diversity system in free-space conditions having relatively good antenna efficiency. When target transmission power is 230 dBm, the transmission diversity system may be configured to output a reference transmission power of 23 dBm through a plurality of power amplifiers corresponding to respective antennas.

TABLE 1

| | Single transmission system (target transmission power: 23 dBm) | Transmission diversity system (target transmission power: 23 dBm) (reference transmission power: 20 dBm + 20 dBm) |
| --- | --- | --- |
| Tx antenna | PCC antenna | First PCC antenna + second PCC antenna |
| Number of power amplifiers | 1 | 2 |
| Current consumption | About 600 mA (based on B7 band) | About 740 mA (based on B7 band) |

In the transmission diversity system, it is possible to reduce power consumption by differentially controlling the power of a plurality of transmission antennas.

It is possible to measure I/Q values of fed back signals through couplers connected to a first transmission antenna and a second transmission antenna output with the same reference transmission power in a transmission diversity system in which the electronic device 100 generates one transmission beam from information corresponding to target transmission power received from the BS 120. It is possible to extract a first antenna gain value of the first transmission antenna and a second antenna gain value of the second transmission antenna from a pre-stored mapping table in accordance with the measured I/Q values and compare a relative gain state between a plurality of transmission antennas based on the antenna gain values.

It is possible to calculate an antenna gain difference value based on the first antenna gain value and the second antenna gain value, determine a first transmission power generated by compensating for the antenna gain difference value from a reference transmission power with respect to a transmission antenna having a relatively good gain state, and calculate a second transmission power for a transmission antenna having a relatively bad gain state based on the first transmission power, thereby differentially controlling the transmission power of the plurality of antennas. Through the differential transmission power control, power consumption can be reduced compared to the case in which signals having the same (or a similar) power are transmitted through a plurality of antennas.

It is possible to perform control to output a signal of a relatively high transmission power with respect to the transmission antenna having the relatively good gain state and to output a signal of a relatively low transmission power with respect to the transmission antenna having the relatively bad gain state, thereby minimizing power consumption of the electronic device 100.

Figure 2:
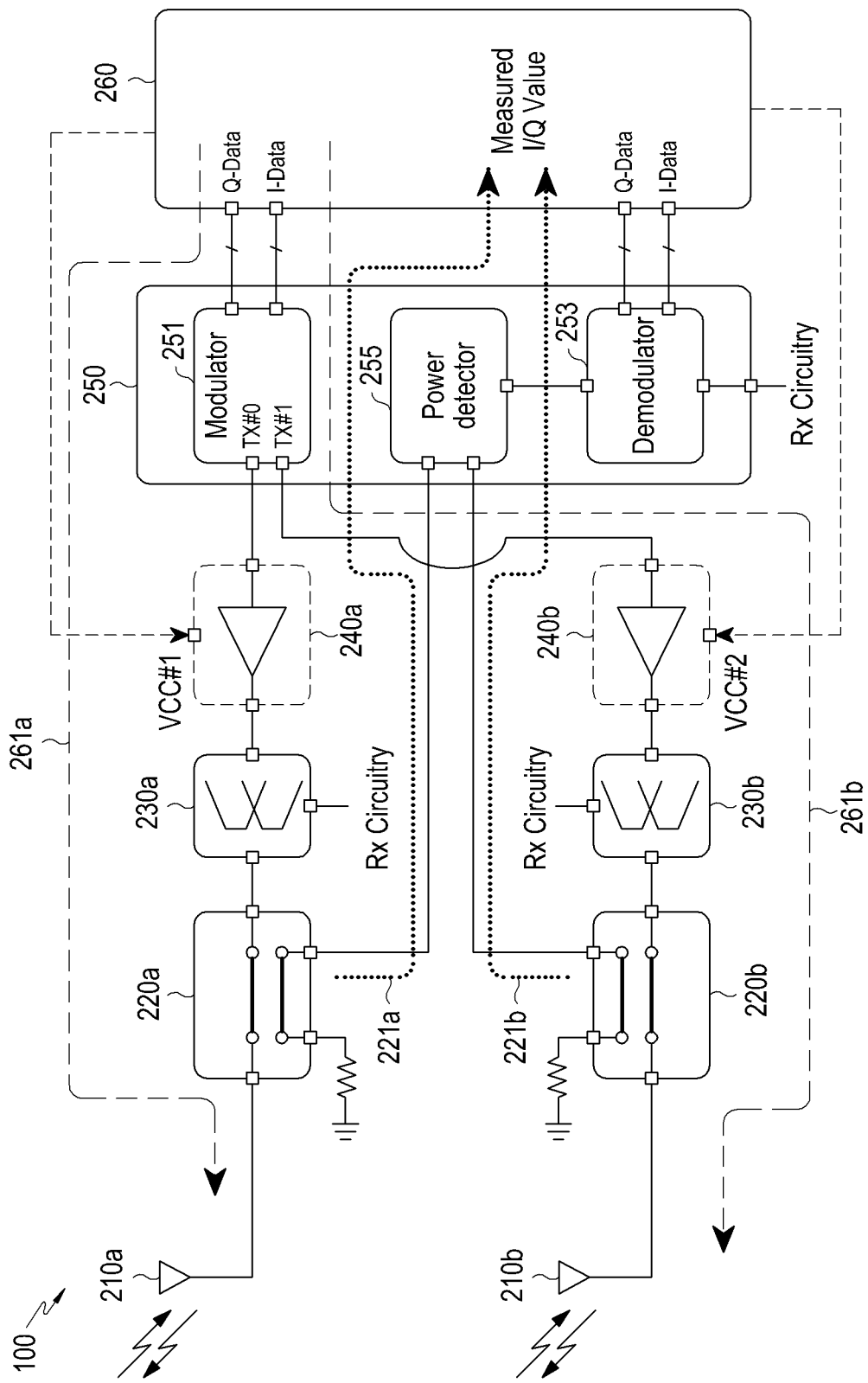
FIG. 2 is a circuit diagram illustrating a detailed structure of the electronic device, according to an embodiment.

FIG. 2 is a circuit diagram illustrating a detailed structure of the electronic device, according to an embodiment.

Referring to FIG. 2, the electronic device 100 includes at least one of a first antenna 210a (for example, a first transmission antenna), a second antenna 210b (for example, a second transmission antenna), a first coupler 220a, a second coupler 220b, a first duplexer 230a, a second duplexer 230b, a first power amplifier 240a, a second amplifier 240b, a transceiver 250, and a processor 260. The transceiver 250 includes a modulator 251, a demodulator 253, and a power detector 255. In FIG. 2, reference numerals 261a and 261b indicate movement paths of a Tx signal.

The transmission diversity system may include a plurality of antennas, as illustrated in FIG. 2. Although FIG. 2 includes two antennas for convenience of description, embodiments may be applied to a transmission diversity system having three or more antennas.

The electronic device 100 may receive a transmission power parameter transmitted from the BS 120 through at least one of the plurality of antennas 210a and 210b and reception (Rx) circuitry. The processor 260 may calculate (or determine) a target transmission power through the received transmission power parameter.

When the target transmission power is larger than or equal to a predetermined power threshold value (for example, 18 dBm), the processor 260 of the electronic device 100 may generate a plurality of PCC signals for transmission diversity. The plurality of PCC signals generated by the processor 260 may be modulated through the modulator 251 of the transceiver 250 and then transmitted through the path connected to each antenna.

For example, the first transmission signal (i.e., TX #0) may be amplified in accordance with a power supply of VCC #1 through the first power amplifier 240a, and may be wirelessly radiated through the first antenna 210a via the first duplexer 230a and the first coupler 220a. For example, the second transmission signal (i.e., TX #1) may be amplified in accordance with a power supply of VCC #2 through the second power amplifier 240b and may be wirelessly radiated through the second antenna 210b via the second duplexer 230b and the second coupler 220b.

The processor 260 may determine a transmission power of respective PCC signals transmitted through the plurality of antennas 210a and 210b based on the target transmission power. For example, the processor 260 may determine a reference transmission power having the same value for a plurality of PCC signals based on the assumption that a plurality of antennas having the same antenna gain. The processor 260 may control the first power amplifier 240a and the second amplifier 240b with the same VCC (VCC #1=VCC #2) based on the determination of the reference transmission power. For example, a process of transmitting the first PCC signal and the second PCC signal with the reference transmission power may be implemented during an LTE random access procedure through a physical random access channel (PRACH) preamble transmission process.

A plurality of PCC signals generated through the processor 260 may be amplified to a VCC voltage corresponding to the reference transmission power through the first power amplifier 240a and the second power amplifier 240b, and may be transmitted to the BS 120 through the first transmission antenna 210a (for example, a first PCC antenna) and the second transmission antenna 210b (for example, a second PCC antenna).

The couplers 220a and 220b may be disposed between the antennas 210a and 210b and the TX circuitry (for example, the duplexer 230a and 230b or the power amplifiers 240a and 240b) as illustrated in FIG. 2, and a plurality of PCC signals may be output through the antennas 210a and 210b and fed back to the transceiver 250 or the processor 260 through the couplers 220a and 220b at the same time.

The transceiver 250 may measure the actual transmission power (for example, the analog transmission power) of the PCC signals output through the antennas 210a and 210b by the power detector 255 and demodulate the plurality of PCC signals through the demodulator 253. Although FIG. 2 illustrates the case where the demodulator 253 demodulates the plurality of PCC signals measured by the power detector 255, separate demodulators may be configured to demodulate each of the plurality of PCC signals according to various embodiments. The demodulator 253 may receive signals from the antennas 210a and 210b through the Rx circuitry and demodulate the received signals.

The processor 260 may measure I/Q values (for example, digital values) for the plurality of demodulated PCC signals received from the transceiver 250. The electronic device 100 may measure impedance between a plurality of antennas and a free space and identify an antenna impedance change, such as contact of a hand, a head or an accessory connection of earphones or a USB cable through real time measurement of the I/Q value.

The measurement of impedance may not be synchronized to the reception of a downlink signal and may be synchronized only to the transmission of an uplink signal.

When the same PCC signals are ideally output through a plurality of antennas having the same antenna gain, the reference transmission power may be a specific transmission power that meets a target transmission power received from the BS 120. For example, the reference transmission power may be calculated through Equation (3), below.

$$\text{Target transmission power [mW]} = 10 * \log_{10}(\text{reference transmission power [dBm]} + \text{reference transmission power [dBm]}) \quad (3)$$

Table 2, below, denotes reference transmission power of the first antenna and the second antenna when the transmission diversity system is activated in the state in which the target transmission power is larger than or equal to 18 dBm. Since the reference transmission power of the first antenna and the reference transmission power of the second antenna may be the same as each other, log to (2*Reference Transmit Power) may be obtained. The reference transmission power may correspond to transmission power of a PRACH preamble signal.

TABLE 2

| Target transmission power (>18 dBm) | First antenna reference transmission power | Second antenna reference transmission power |
|---|---|---|
| 23 dBm (200 mW) | 20 dBm | 20 dBm |
| 22 dBm (200 mW) | 18.9 dBm | 18.9 dBm |
| 21 dBm (200 mW) | 17.9 dBm | 17.9 dBm |
| 20 dBm (200 mW) | 17 dBm | 17 dBm |
| 19 dBm (200 mW) | 16 dBm | 16 dBm |
| 18 dBm (200 mW) | 15 dBm | 15 dBm |

The transmission power of the first antenna and the transmission power of the second antenna may be differentially controlled. For example, the processor 260 may differentially determine the transmission power of the first antenna and the transmission power of the second antenna and differentially configure VCC #1 and VCC #2 supplied to the first power amplifier 240*a* and the second power amplifier 240*b* according to the determined transmission power, thereby differentially controlling the transmission power of the first antenna and the transmission power of the second antenna.

An electronic device may include a housing; a first antenna located at a first part of the housing; a second antenna located at a second part separated from the first part of the housing; a transceiver configured to generate a first signal and a second signal; a first coupler electrically connected between the first antenna and the transceiver and configured to receive the first signal from the transceiver and provide the received first signal to the first antenna; a second coupler electrically connected to the second antenna and the transceiver and configured to receive the second signal from the transceiver and provide the received second signal to the second antenna; and a control circuit operationally connected to the transceiver, wherein the control circuit may be configured to determine at least one value related to gains of the first signal and the second signal based at least partially on the signals (e.g., feedback signals) provided from the first coupler and the second coupler, determine whether the first signal has a higher gain than that of the second signal, and allow the first signal to have increased transmission power and the second signal to have reduced transmission power based at least partially on the at least one value related to the gains.

The electronic device may further include a communication processor including the control circuit.

The electronic device may further include a first power amplifier electrically connected between the first coupler and the transceiver; and a second power amplifier electrically connected between the second coupler and the transceiver, wherein the control circuit may be configured to control the first and second power amplifiers in order to allow the first signal to have increased transmission power and the second signal to have reduced transmission power.

The housing may include a front plate, a rear plate facing a direction opposite the front plate, and a side member surrounding a space between the front place and the rear plate, and the side member may include a first conductive portion provided as the first antenna and a second conductive portion provided as the second antenna.

The control circuit may be configured to generate the first signal and the second signal in order to provide transmission diversity.

The first signal and the second signal may be PCC signals of an identical frequency.

The control circuit may determine a first value related to the gain of the first signal and a second value related to the gain of the second signal, determine a difference between the first value and the second value, and determine the increased transmission power and the reduced transmission power based at least partially on the difference.

The control circuit may be configured to determine the first value and the second value based on a constellation diagram.

The control circuit may be configured to determine the first value and the second value through a mapping table.

The increased transmission power may be calculated by adding a value corresponding to the difference between the first value and the second value to a reference power, and the reduced transmission power may be calculated by subtracting the increased transmission power from a target transmission power.

Figure 3:
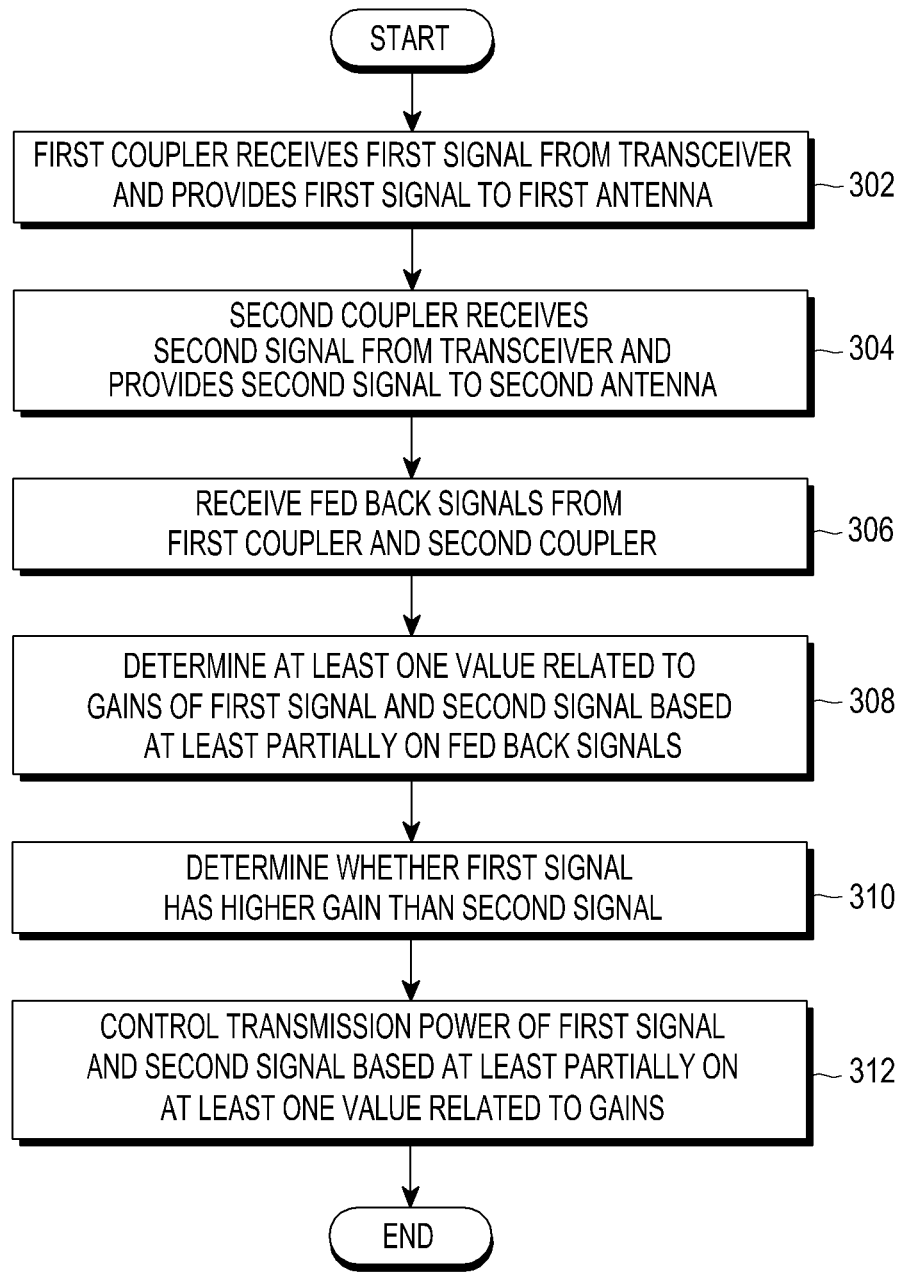
FIG. 3 is a flowchart illustrating a method of controlling transmission diversity power by an electronic device, according to an embodiment.

FIG. 3 is a flowchart illustrating a method of controlling transmission diversity power by an electronic device, according to an embodiment.

Referring to FIG. 3, in the electronic device 100, a first coupler 220*a* receives a first signal (for example, a first PCC signal) from a transceiver 250 and provides the received first signal to a first antenna 210*a* in operation 302.

In operation 304, in the electronic device 100, a second coupler 220*b* receives a second signal (for example, the second PCC signal) from a transceiver 250 and provides the received second signal to a second antenna 210*b*. Operations 302 and 304 may be simultaneously or sequentially performed. In operation 306, the electronic device 100 (for example, the transceiver 250 of FIG. 2) receives signals fed back from the first coupler and the second coupler.

In operation 308, the electronic device 100 (for example, the processor 260 of FIG. 2) determines at least one value related to gains of the first signal and the second signal based on at least some of the signals fed back from the first coupler and the second coupler.

The electronic device 100 determines which signal has a higher gain between the first signal and the second signal in operation 310, and controls each of the first signal and the second signal based at least partially on at least one value related to the gains in operation 312. For example, the electronic device 100 may control the first signal to have increased transmission power and the second signal to have reduced transmission power.

A method of operating an electronic device may include a operation of receiving a first signal from a transceiver and providing the received first signal to a first antenna by a first coupler electrically connected between the first antenna and the transceiver; a operation of receiving a second signal from the transceiver and providing the received second signal to a second antenna by a second coupler electrically connected between the second antenna and the transceiver; a operation of receiving fed back signals from the first coupler and the second coupler; a operation of determining at least one value related to gains of the first signal and the second signal based at least partially on the fed back signals; a operation of determining whether the first signal has a higher gain than that of the second signal; and a operation of performing control to allow the first signal to have increased transmission power and the second signal to have reduced transmission power based at least partially on the at least one value related to the gains.

The method may further include a operation of generating the first signal and the second signal in order to provide transmission diversity.

The first signal and the second signal may be PCC signals of an identical frequency.

The method may further include a operation of determining a first value related to the gain of the first signal and a second value related to the gain of the second signal; a operation of determining a difference between the first value and the second value; and a operation of determining the increased transmission power and the reduced transmission power based at least partially on the difference.

The first value and the second value may be determined based on a constellation diagram.

The first value and the second value may be determined through a mapping table.

The increased transmission power may be calculated by adding a value corresponding to the difference between the first value and the second value to a reference power, and the reduced transmission power may be calculated by subtracting the increased transmission power from a target transmission power.

The operation of providing the first signal to the first antenna and providing the second signal to the second antenna may further include a operation of providing the signals with a reference transmission power being transmitted when the electronic device performs a random-access procedure with a base station.

The reference transmission power may be determined based on a transmission power parameter received from the base station.

The transmission power may correspond to a PRACH preamble transmission signal.

According to a method of differentially controlling a transmission power, the electronic device may transmit a first PCC signal and a second PCC signal corresponding to PRACH preamble signals and then determine two transmission power compensation values based on fed back TX signals. While compensating for the transmission power, a random-access response message for the PRACH preamble signal may be received from the BS and the reception may be finished before an RRC connection setup process is performed.

According to another method of differentially controlling a transmission power, the electronic device may compensate for an antenna gain difference between a plurality of transmission antennas based on a gain state of each of the plurality of antennas. The electronic device may compensate for a reference transmission power by reflecting a physical path loss.

According to another method of differentially controlling a transmission power, the electronic device 100 may measure I/Q values for transmission signals fed back from a plurality of transmission antennas through the processor. Alternatively, the measured I/Q values may be divided into a real value (I-Value) and an imaginary value (Q-Value). The real value and the imaginary value may be defined as complex values.

A mapping table including a magnitude value and a phase value corresponding to the measured I/Q value may be defined in Table 3, below. Further, the mapping table may include an antenna gain value of a target antenna (for example, the first antenna or the second antenna) corresponding to the measured I/Q value.

TABLE 3

| Index | I-Value | Q-Value | Magnitude | Phase (angle) | Antenna gain | User scenario (user state) |
|---|---|---|---|---|---|---|
| P1 | −4337 | 3835 | 0.40 | 0.0 | −6 dBi | earjack |
| P2 | −5203 | 533 | 0.40 | 45.0 | −4 dBi | Free space |
| ... | ... | ... | ... | ... | ... | ... |
| P24 | −2115 | 9317 | 0.80 | 315.0 | −12 dBi | hand |
| P25 | −1599 | 931 | 0.00 | 0.0 | −8 dBi | USB cable |

The mapping table in Table 3 may be defined through experimental data collected in advance, and experimental data may be classified according to a user scenario and a change in impedance surrounding a target antenna. For example, the user scenario (user state) may be one of a hand condition (e.g., a hand-grip state), a head condition (e.g., a phone call state), and an accessory connection condition (e.g., a state in which an accessory (such as an earjack or USB cable) is connected to the phone). For example, the experimental data may be acquired by outputting a transmission signal having a predetermined magnitude and phase through a target antenna according to a user scenario, measuring an antenna gain of the target antenna through external equipment, and measuring an I/Q value of a transmission signal fed back through the processor.

Figure 4:
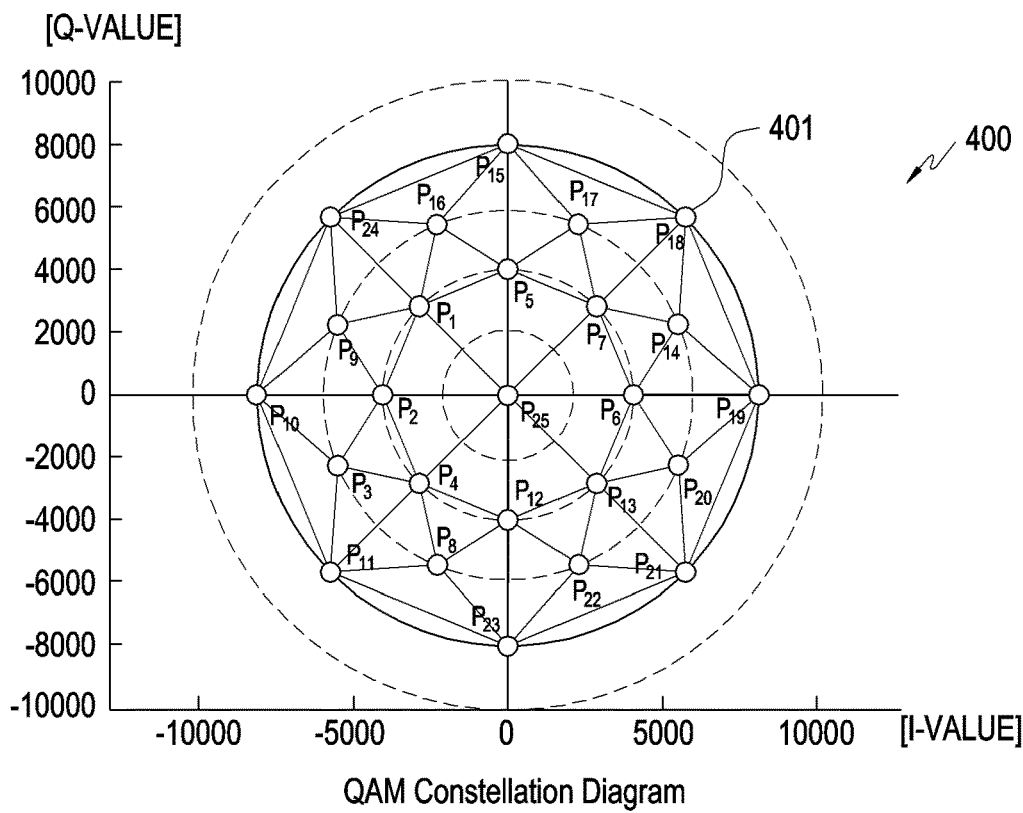
FIG. 4 is a quadrature amplitude modulation (QAM) constellation diagram, according to an embodiment.
Figure 5:
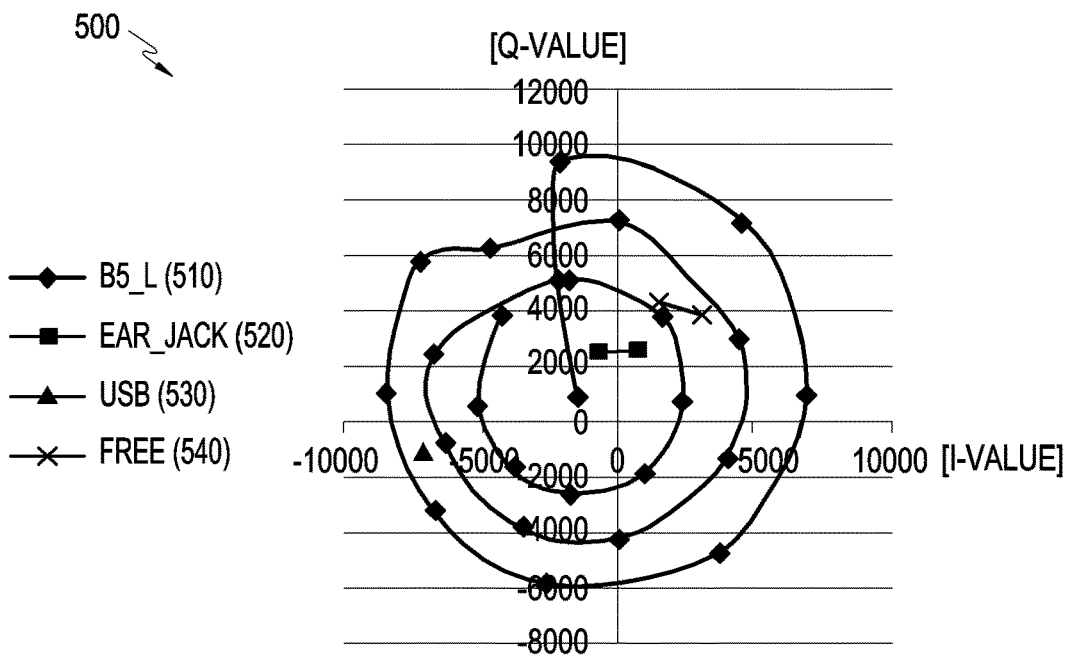
FIG. 5 is a QAM constellation diagram in various environments, according to an embodiment.

Each index in Table 3 may be expressed through QAM constellation diagrams 400 and 500 illustrated in FIGS. 4 and 5.

In the constellation diagram illustrated in FIG. 4, each index may correspond to a point 401 in the constellation diagram.

Referring to FIG. 5, the experimental data in Table 3 may correspond to a point corresponding to the corresponding magnitude and phase according to each user scenario. For example, in FIG. 5, the electronic device 100 may display an I/Q value 510 measured for a transmission signal in a band B5 an I/Q value 520 measured in a state in which an earjack is connected, an I/Q value 530 measured in a state in which a USB cable is connected, and an I/Q value 540 measured in a free space.

An antenna gain value of the target antenna may be determined based on the mapping table pre-stored in accordance with the measured I/Q values. For example, a maximum antenna gain value corresponds to a case in which the target antenna is in the free-space conditions, and an antenna gain value lower than the maximum antenna gain value may be determined in user scenarios other than the free-space conditions.

The mapping tables may be individually configured according to each transmission antenna and a frequency band supported by each transmission antenna. For example, when the transmission diversity system is implemented by the first PCC antenna and the second PCC antenna, two mapping tables may be configured. When two frequency bands are supported for each transmission antenna, four mapping tables may be configured for a plurality of transmission antennas. The plurality of mapping tables may be defined as a mapping table set.

A set of 25 representative I/Q values may be defined based on the measured various I/Q values. For example, the processor 260 may extract one coordinate having an approximate value from the I/Q value set based on the measured I/Q values.

Figure 6:
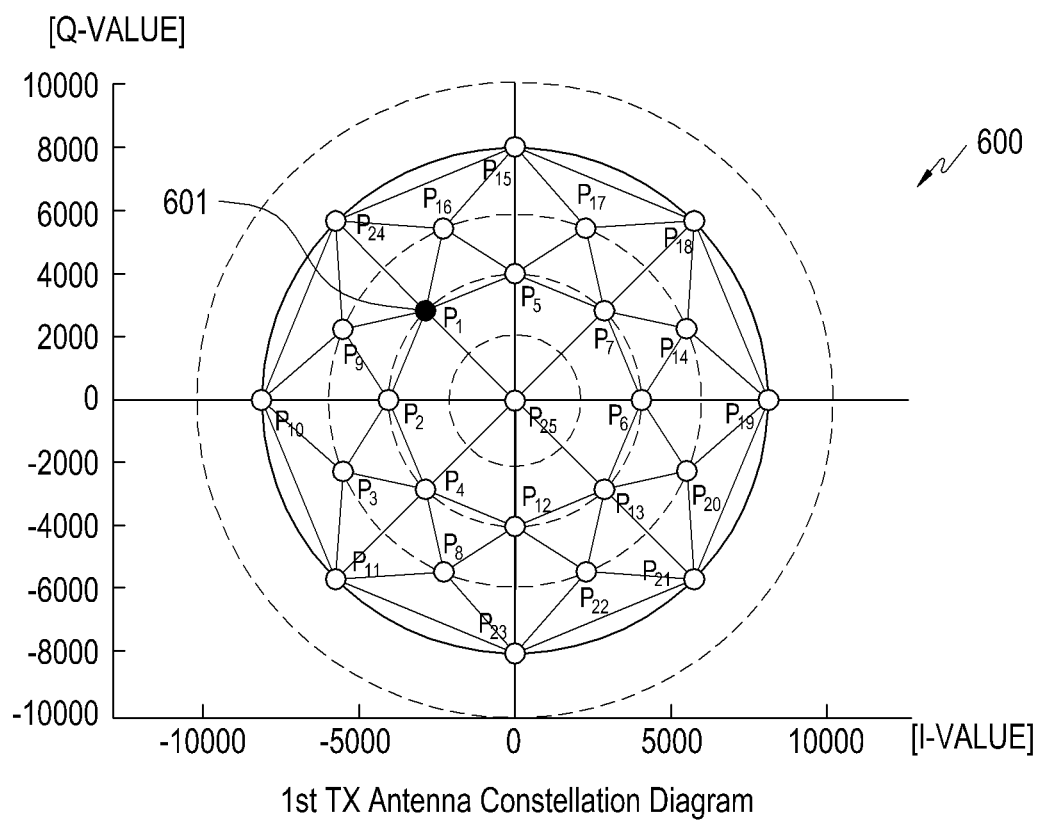
FIG. 6 illustrates a mapping table for a first antenna through a constellation diagram, according to an embodiment.
Figure 7:
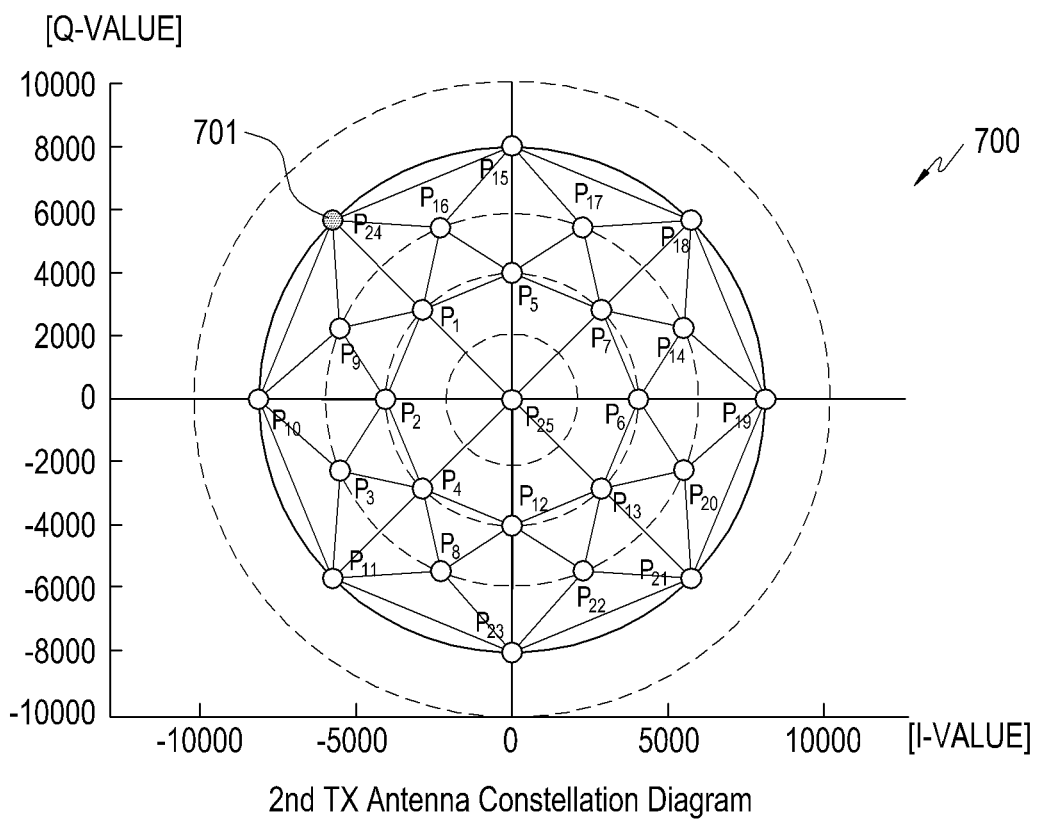
FIG. 7 illustrates a mapping table for a second antenna through a constellation diagram, according to an embodiment.

The mapping tables may be expressed in different forms. For example, the mapping table may be expressed in the form of the QAM constellation diagram illustrated in FIGS. 6 and 7. Referring to FIGS. 6 and 7, the mapping tables may express QAM constellation diagrams 600 and 700 based on a set of I/Q values. For example, the mapping table in Table 3 may be expressed by points 601 and 701 corresponding to 25 coordinates in each of the QAM constellation diagrams 600 and 700 as illustrated in FIGS. 6 and 7. FIG. 6 is the constellation diagram 600 corresponding to the first antenna 210a, and FIG. 7 is the constellation diagram 700 corresponding to the second antenna 210b.

According to an embodiment, it is possible to extract the current antenna gain value from the mapping table by reflecting a change in impedance of a plurality of transmission antennas and compare relative gain states of the plurality of transmission antennas. For example, the electronic device 100 may extract a first antenna gain value (Ant.Gain1) of the first PCC antenna and a second gain value (Ant.Gain2) of the second PCC antenna from the mapping table based on the measured I/Q values. By comparing the extracted first antenna gain value and second antenna gain value, a relative gain state between the first PCC antenna and the second PCC antenna may be determined. For example, a good antenna or a bad antenna may be determined among the plurality of antennas. For example, when Ant.Gain1 of the first PCC antenna is larger than Ant.Gain2 of the second PCC antenna, the first antenna may be determined as the good antenna and the second antenna may be determined as the bad antenna.

It is possible to compare antenna gain values of the first PCC antenna and the second PCC antenna, output relatively higher transmission power through an antenna having a relatively good gain state (for example, the good antenna), and output relatively lower transmission power through an antenna having a relatively bad gain state (for example, the bad antenna).

When generating one transmission beam through a plurality of transmission antennas, power of the transmission beam may be determined according to a target transmission power, and the target transmission power may be determined as a logarithmic value for a sum of transmission power of respective transmission antennas. For example, when one transmission power value is determined such that the first transmission power and the second transmission power have different values, the remaining transmission power may be calculated by, for example, Equation (1) above. The electronic device 100 may first determine transmission power of an antenna having a relatively good gain condition and then determine transmission power of an antenna having a relatively bad gain condition based on the equation.

It is possible to output higher transmission power through the antenna having the relatively good gain state. For example, when the good antenna is determined, the electronic device 100 may calculate a difference between the previous antenna gain value and the current antenna gain value, with respect to the good antenna, and calculate a gain difference value between a plurality of transmission antennas.

The electronic device 100 may further compensate for an antenna gain difference value between a plurality of transmission antennas with respect to the good antenna having the relatively good gain state. For example, with respect to the good antenna having a relatively good gain state, the electronic device 100 may compensate for an antenna gain difference value reflecting an impedance change from reference transmission power based on Equation (4) below.

Target transmission power [mW]=10*log 10(reference transmission power [dBm]+antenna gain difference+bad condition antenna transmission power [dBm])    (4)

Referring to Equation (4) above, when antenna gain values of respective transmission antennas are Ant.Gain1= (−6 dBi) and Ant.Gain2=(−4 dBi), an antenna gain difference value between the transmission antennas may be Ant.Gain Difference=(2 dBi). When a target transmission power is 18 dBm, a reference transmission power is 15 dBm, so that a transmission power for the bad condition antenna may be calculated based on Equation (5), Equation (6), Equation (7), Equation (8), and Equation (9).

63 mW = 10 * log
  10[(15 dBm + 2 dBi) + Bad Condition Antenna Transmit Power]    (5)

18 dBm = [17 dBm + Bad Condition Antenna Transmit Power]    (6)

Target Transmit Power = Good Condition Antenna TX Power +    (7)
  Bad Condition Antenna TX Power Good Condition Antenna Transmit Power =    (8)
  Reference Transmit Power + Ant. Gain Difference = 17 dBm Bad Condition Antenna Transmit Power =    (9)
  Target Transmit Power − Good Condition Antenna
  Transmit Power = 18 dBm − 17 dBm = 1 dBm The differential transmission power control may determine a high transmission power compared to a reference transmission power for the good antenna and determine a low transmission power compared to a reference transmission power for the bad antenna.

Figure 8:
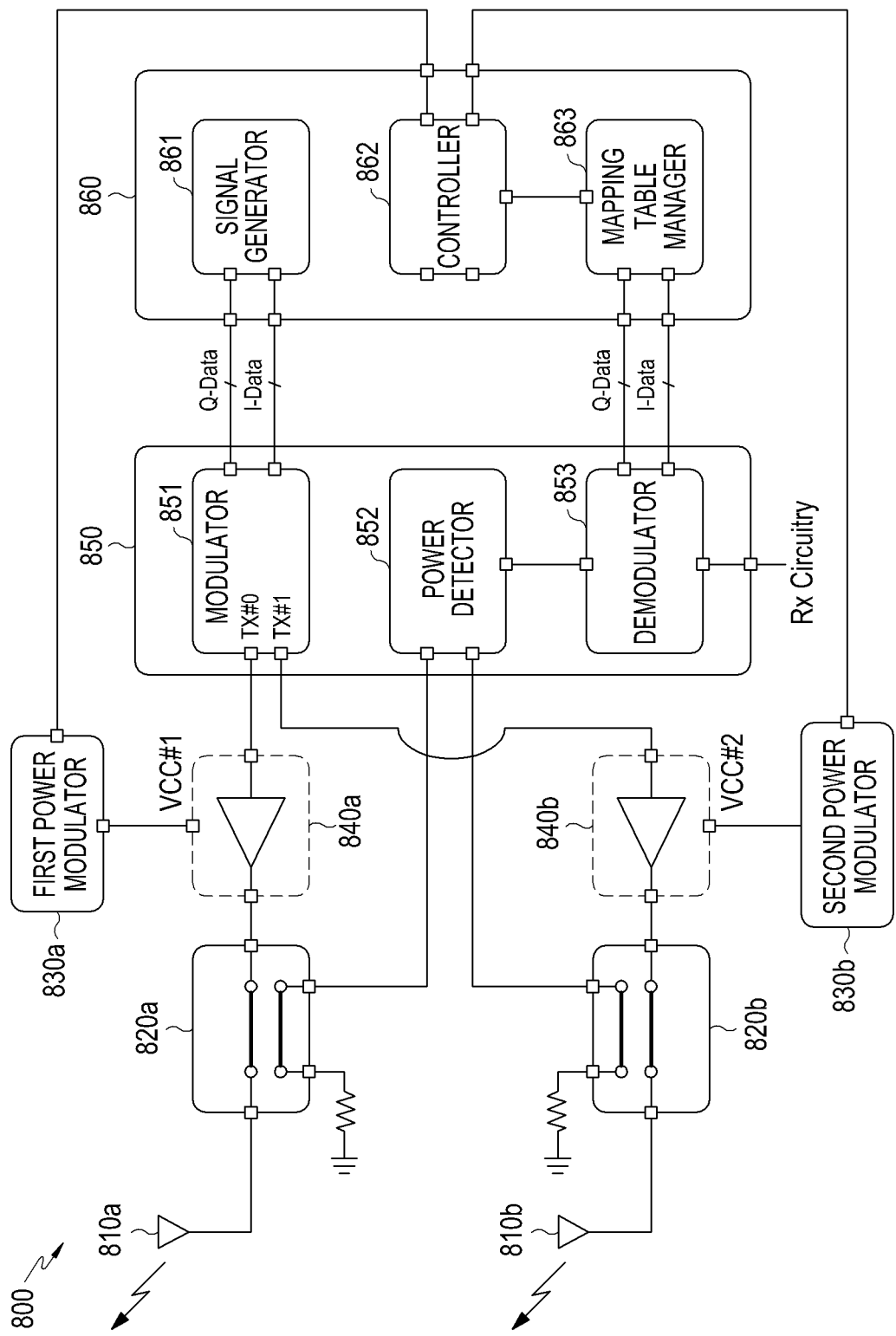
FIG. 8 is a circuit diagram illustrating a detailed structure of the electronic device, according to an embodiment.

FIG. 8 is a circuit diagram illustrating a detailed structure of the electronic device, according to an embodiment.

Referring to FIG. 8, an electronic device 800 includes at least one of a first antenna 810a, a second antenna 810b, a first coupler 820a, a second coupler 820b, a first power modulator 830a, a second power modulator 830b, a first power amplifier 840a, a second power amplifier 840b, a transceiver 850, and a processor 860. The transceiver 850 includes a modulator 851, a demodulator 853, and a power detector 852. The electronic device 800 of FIG. 8 may be the same as or similar to the electronic device 100 of FIG. 1 or FIG. 2.

The transmission diversity system may include a plurality of antennas, as illustrated in FIG. 8. Although FIG. 8 includes two antennas for convenience of description, a transmission diversity system having three or more antennas may be provided.

The electronic device 800 may receive a transmission power parameter transmitted from the BS 120 through at least one of the plurality of antennas 810a and 810b and a reception circuit (Rx circuitry). The processor 860 may calculate (or determine) target transmission power through the received transmission power parameter.

When the target transmission power is larger than or equal to a predetermined power threshold value (for example, 18 dBm), the processor 860 of the electronic device 800 may generate a plurality of PCC signals for transmission diversity. The plurality of PCC signals generated by the processor 860 may be modulated through the modulator 851 of the transceiver 850 and then transmitted through the path connected to each antenna.

For example, the first transmission signal (TX #0) output from the modulator 851 may be amplified in accordance with the power supply of VCC #1 through the first power amplifier 840a and may be wirelessly radiated through the first antenna 810a via the first coupler 820a. The second transmission signal (TX #1) output from the modulator 851 may be amplified in accordance with the power supply of VCC #2 through the second power amplifier 840b and may be wirelessly radiated through the second antenna 810b via the second coupler 820b.

The processor 860 may determine the transmission power of respective PCC signals transmitted through the plurality of antennas 810a and 810b based on the target transmission power. For example, the processor 860 may determine a reference transmission power having the same value for a plurality of PCC signals based on the assumption that a plurality of antennas have the same antenna gain. The processor 860 may control the first power amplifier 840a and the second power amplifier 840b with the same VCC (VCC #1=VCC #2) based on the determination of the reference transmission power. For example, a process of transmitting the first PCC signal and the second PCC signal with the reference transmission power may be implemented during an LTE random access procedure, for example, through a PRACH preamble transmission process.

The plurality of PCC signals generated through the processor 860 may be amplified with the VCC voltages corresponding to the reference transmission power through the first power amplifier 840*a* and the second power amplifier 840*b* and may be transmitted to the BS 120 through the first transmission antenna 810*a* (for example, the first PCC antenna) and the second transmission antenna 810*b* (for example, the second PCC antenna).

The couplers 820*a* and 820*b* may be disposed between the antennas 810*a* and 810*b* and the TX circuitry (for example, the power amplifiers 840*a* and 840*b*) as illustrated in FIG. 8, and the plurality of PCC signals may be output through the antennas 810*a* and 810*b* and fed back to the transceiver 850 or the processor 860 through the couplers 820*a* and 820*b* at the same time.

The transceiver 850 may measure an actual transmission power (for example, an analog transmission power) of the PCC signals output through the antennas 810*a* and 810*b* by the power detector 852 and demodulate the plurality of PCC signals through the demodulator 853. Although FIG. 8 illustrates that the demodulator 853 demodulates the plurality of PCC signals measured by the power detector 852 and receives reception signals received from the antennas 810*a* and 810*b* through the Rx circuitry and demodulates the received signals, separate demodulators 853 may be configured to perform demodulation.

The processor 860 may measure I/Q values (for example, digital values) for the plurality of demodulated PCC signals received from the transceiver 850. The electronic device 800 may measure impedance between a plurality of antennas and a free space and identify an antenna impedance change, for example due to contact with a hand or a head or connection of an accessory such as earphones or a USB cable, through real-time measurement of the I/Q value. The measurement of impedance may not be synchronized with the reception of a downlink signal but may be synchronized with the transmission of an uplink signal.

When the same PCC signals are ideally output through a plurality of antennas having the same antenna gain, the reference transmission power may be a specific transmission power that meets a target transmission power received from the BS 120. For example, the reference transmission power may be calculated using Equation (3).

The transmission power of the first antenna and transmission power of the second antenna may be differentially controlled. For example, the processor 860 may differentially determine the transmission power of the first antenna and the transmission power of the second antenna, and the controller 862 may perform control to differentially supply VCC #1 and VCC #2 supplied to the first power amplifier 840*a* and the second power amplifier 840*b* according to the determined transmission power through the first power modulator 830*a* and the second power modulator 830*b*, thereby differentially controlling the transmission power of the first antenna and the transmission power of the second antenna.

According to an embodiment, it is possible to determine a good antenna and a bad antenna and differentially control the transmission power of the transmission antennas based on measured I/Q values. For example, the processor 860 may include a mapping table manager 863. The mapping table manager 863 may measure the I/Q value of the transmission signal fed back (or reflected) through each coupler 820*a* or 820*b* and extract an antenna gain value of each transmission antenna from a mapping table (for example, a mapping table stored in a memory of the electronic device) in accordance with the measured I/Q value.

The mapping table manager 863 may transfer the antenna gain value extracted from the mapping table to the controller 862. The controller 862 may determine antenna gain values of the good antenna and the bad antenna based on, for example, the above-described equations, and transmit differentially controlled control signals (for example, analog-to-digital converter (ADC) values) to the first power modulator 830*a* and the second power modulator 830*b*. The power modulators 830*a* and 830*b* may supply voltages (for example, VCC #1 and VCC #2) corresponding to the control signals received from the controller 862 of the processor 860 to the power amplifiers 840*a* and 840*b*.

The electronic device 800 may transmit the first PCC signal and the second PCC signal corresponding to the PRACH preamble signals to the BS through the plurality of antennas 810*a* and 810*b*, and then determine a compensation value of transmission power through various methods based on the transmission signals fed back (or reflected) by the couplers 820*a* and 820*b*.

In a process of compensating for the transmission power, a random-access response message for the PRACH preamble signal may be received from the BS, and reception may be finished before an RRC connection setup process is performed. After the RRC connection setup process, the electronic device may perform the process of compensating for the transmission power by feeding back the transmission power transmitted through each antenna by the electronic device after the electronic device performs the RRC connection setup process.

Figure 9:
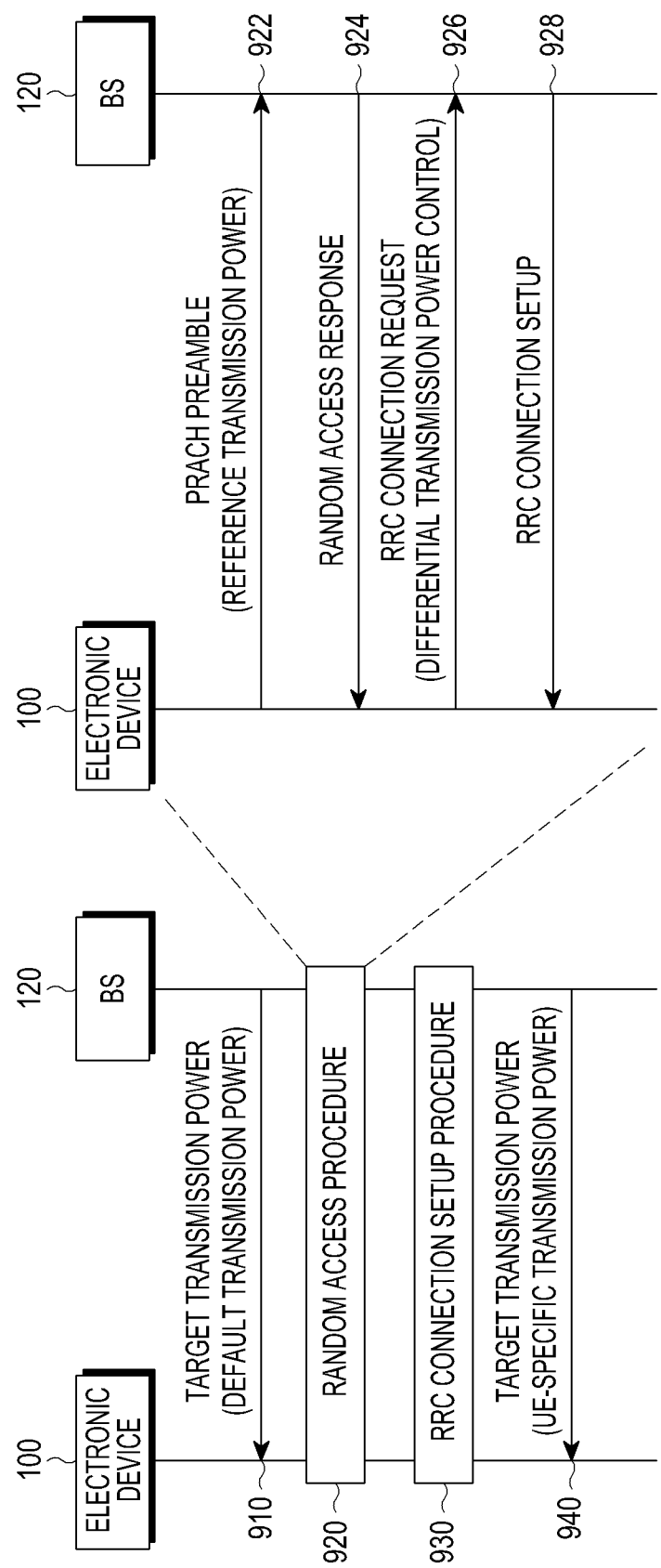
FIG. 9 illustrates a signal flow between the electronic device and the base station (BS) for transmission diversity power control, according to an embodiment.

FIG. 9 illustrates a signal flow between the electronic device and the BS for transmission diversity power control, according to an embodiment.

Referring to FIG. 9, in operation 910, the electronic device 100 receives a parameter corresponding to a target transmission power (for example, a default transmission power) from the BS 120.

In operation 920, the electronic device 100 performs a random-access procedure with the BS 120. For example, the electronic device 100 transmits a PRACH preamble signal to the BS 120 in operation 922. The PRACH preamble signal may be transmitted with a reference transmission power.

In operation 924, the electronic device 100 receives a random-access response from the BS 120. In operation 926, the electronic device 100 transmits an RRC connection request to the BS. The RRC connection request signal may be transmitted with differential transmission power differentially controlled for each antenna, as described above. In operation 928, the electronic device 100 receives an RRC connection setup message from the BS 120.

When the random-access procedure is completed as described above, the electronic device 100 performs an RRC connection setup procedure with the BS 120 in operation 930. In operation 940, the BS 120 transmits a target transmission power to the electronic device 100. The target transmission power may be a transmission power designated to each electronic device (or UE).

Figure 10:
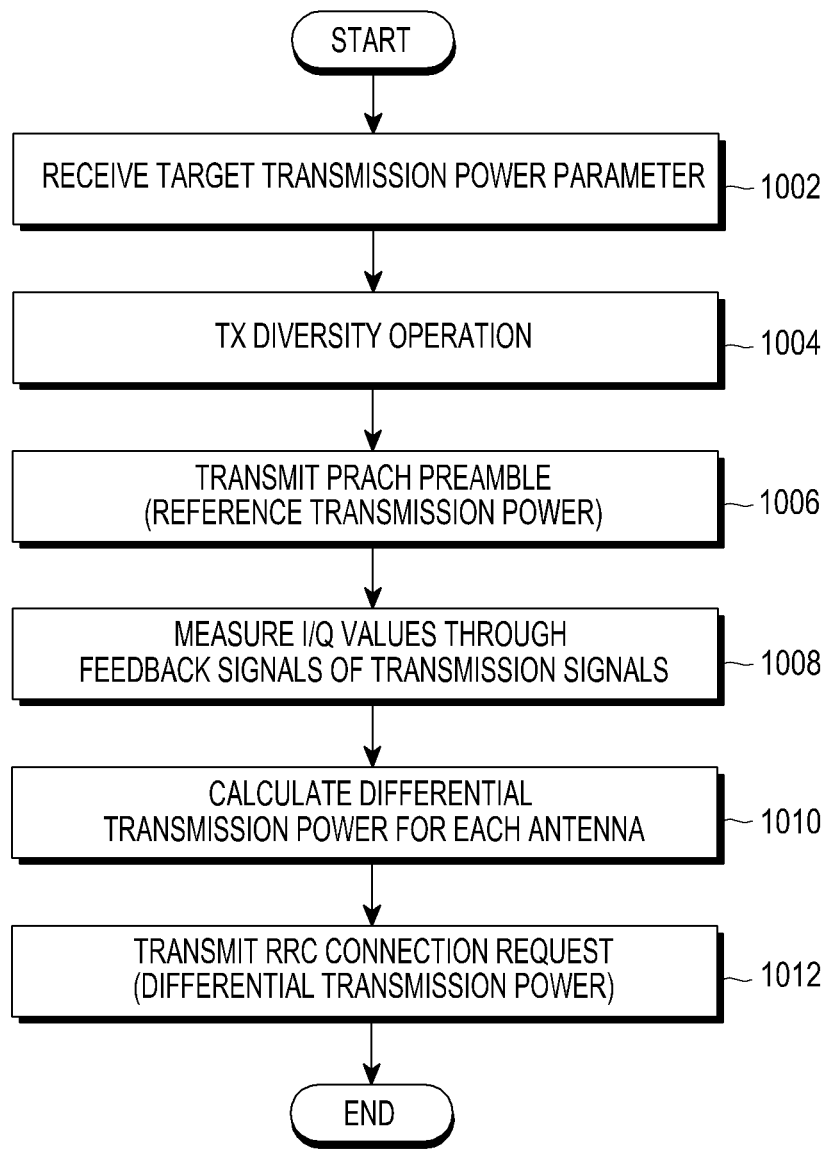
FIG. 10 is a flowchart illustrating a method of controlling transmission diversity power by an electronic device, according to an embodiment.

FIG. 10 is a flowchart illustrating a method of controlling transmission diversity power by an electronic device, according to an embodiment.

Referring to FIG. 10, in operation 1002, an electronic device (for example, the electronic device 100 of FIG. 1 or the electronic device 800 of FIG. 8) receives a target transmission power parameter from a BS 120. In operation 1004, the electronic device operates in a transmission diversity system.

In operation 1006, the electronic device transmits a PRACH preamble with reference transmission power. In operation 1008, the electronic device measures an I/Q value through a reflected or fed back signal of the transmitted PRACH preamble through, for example, a coupler. In operation 1010, the electronic device calculates a differential transmission power for each antenna.

In operation 1012, the electronic device transmits an RRC connection request with the differential transmission power.

When target transmission power of the PUSCH is greater than or equal to, for example, 18 dBm, the electronic device may activate the transmission diversity system and perform differential transmission power control.

The electronic device may perform the differential transmission power control operation through at least one of the following two embodiments.

(1) A case in which a transmission power of a good antenna is larger than a limited transmission power (for example, a first threshold value); or (2) A case in which a gain difference between a good antenna and a bad antenna is larger than a threshold value (for example, a second threshold value).

When a transmission power of the good antenna is larger than a limited transmission power (for example, a first threshold value), the differential transmission power control may be performed through the following method with reference to Equation (10), Equation (11), and Equation (12), below.

For example, when it is assumed that target transmission power is 23 dBm, which is the maximum power, a reference transmission power is 20 dBm, and an antenna gain difference is 6 dBm, a transmission power of the good antenna may become larger than the maximum power. In this case, the transmission power of the good antenna may be configured to be limited within 23 dBm, which is the maximum power. The maximum power may be defined as a limited transmission power.

When the good antenna outputs the limited transmission power, a transmission power of the bad antenna may be determined to be in an OFF state. For example, the electronic device may operate the transmission diversity system in a deactivated (De-Activation) state.

$$200 \text{ mW}=10*\log 10[(20 \text{ dBm}+6 \text{ dBi})+\text{Bad Condition Antenna Transmit Power}] \quad (10)$$

$$\text{Target Transmit Power}(23 \text{ dBm})=[26 \text{ dBm}+\text{Bad Condition Antenna Transmit Power}] \quad (11)$$

$$\text{Target Transmit Power}(23 \text{ dBm})=[\text{Limited Transmit Power}(23 \text{ dBm})+\text{Bad Condition Antenna Power OFF}] \quad (12)$$

When a gain difference between the good antenna and the bad antenna is larger than a threshold value (for example, a second threshold value), the differential transmission power control may be performed such that when the antenna gain difference is greater than the threshold value, an impedance state of the bad antenna may not comply with a transmission diversity system activation condition, as in Equation (13) below. In this case, power consumption of the bad antenna is slight and power consumption of the good antenna accounts for most of the power consumption, so that it may be more efficient to use a single transmission system rather than executing the transmission diversity system. The standard disclosed in the 3GPP standard presents tolerance within a predetermined range of target transmission power and the tolerance of the target transmission power may vary depending on a power class.

$$\text{Antenna Gain Difference}>\text{Threshold Value}(3 \text{ dBm}+ \text{Maximum Tolerance})(\text{Good Condition Antenna Gain}>>\text{Bad Condition Antenna Gain}) \quad (13)$$

The difference value between the input reference transmission power and the output reference transmission power that is actually output due to a physical path loss, may be measured. TX signals reflected from the first antenna and the second antenna may be measured in a voltage form through a power detector 852. The measured voltage may be converted into an actually output reference transmission power through a transmission power conversion algorithm. The electronic device may calculate a difference value between an initially configured reference transmission power and an actually output reference transmission power and determine a compensation value for the reference transmission power, and thus decide to reflect the compensation value in the transmission power as shown in Equation (14).

$$\text{Target Transmit Power [mW]}=10*\log 10((((\text{Reference Transmit Power}+\text{Physical Error})+\text{Ant.Gain Difference})+\text{Bad Condition Antenna Transmit Power})) \quad (14)$$

Figure 11:
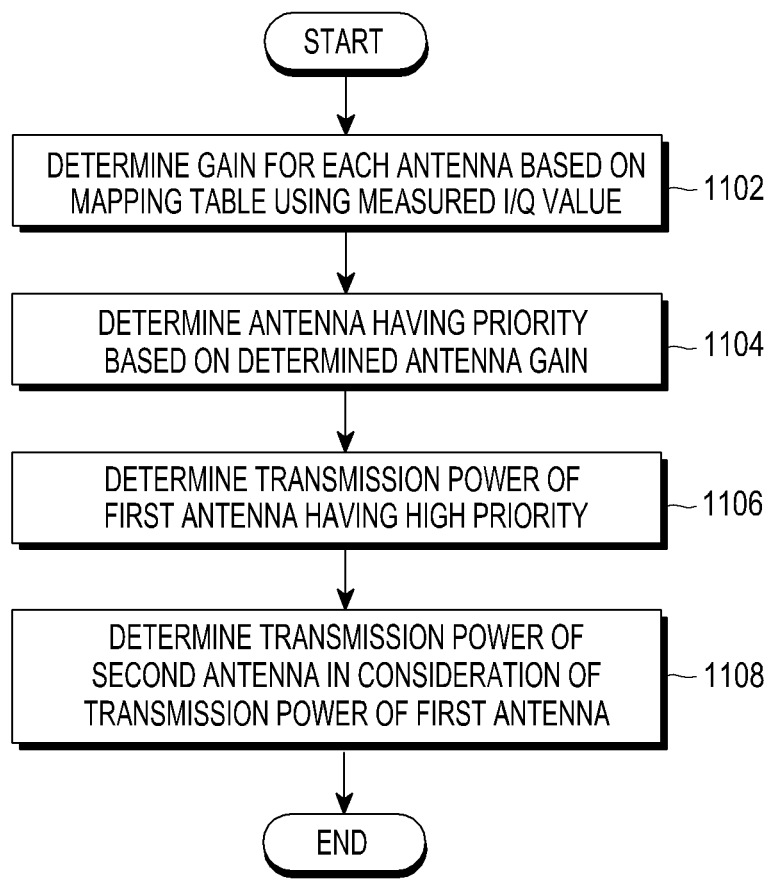
FIG. 11 is a flowchart illustrating a method of controlling transmission diversity power by an electronic device, according to an embodiment.

FIG. 11 is a flowchart illustrating a method of controlling transmission diversity power by the electronic device, according to an embodiment.

Referring to FIG. 11, an electronic device (for example, the electronic device 100 of FIG. 1 or the electronic device 800 of FIG. 8) determines a gain for each antenna from a mapping table using a measured I/Q value in operation 1102. In operation 1104, the electronic device determines an antenna having a priority from the determined gain for each antenna.

When the first antenna has a relatively better gain state than the second antenna based on the determination result, the first antenna may be determined to be the good antenna and a higher priority may be assigned to the first antenna. In operation 1106, the electronic device determines the transmission power of the first antenna having the higher priority. In operation 1108, the electronic device determines the transmission power of the second antenna based on the determined transmission power of the first antenna. The electronic device may perform differential transmission power control by differently configuring the transmission power of the first antenna and the transmission power of the second antenna.

Figure 12:
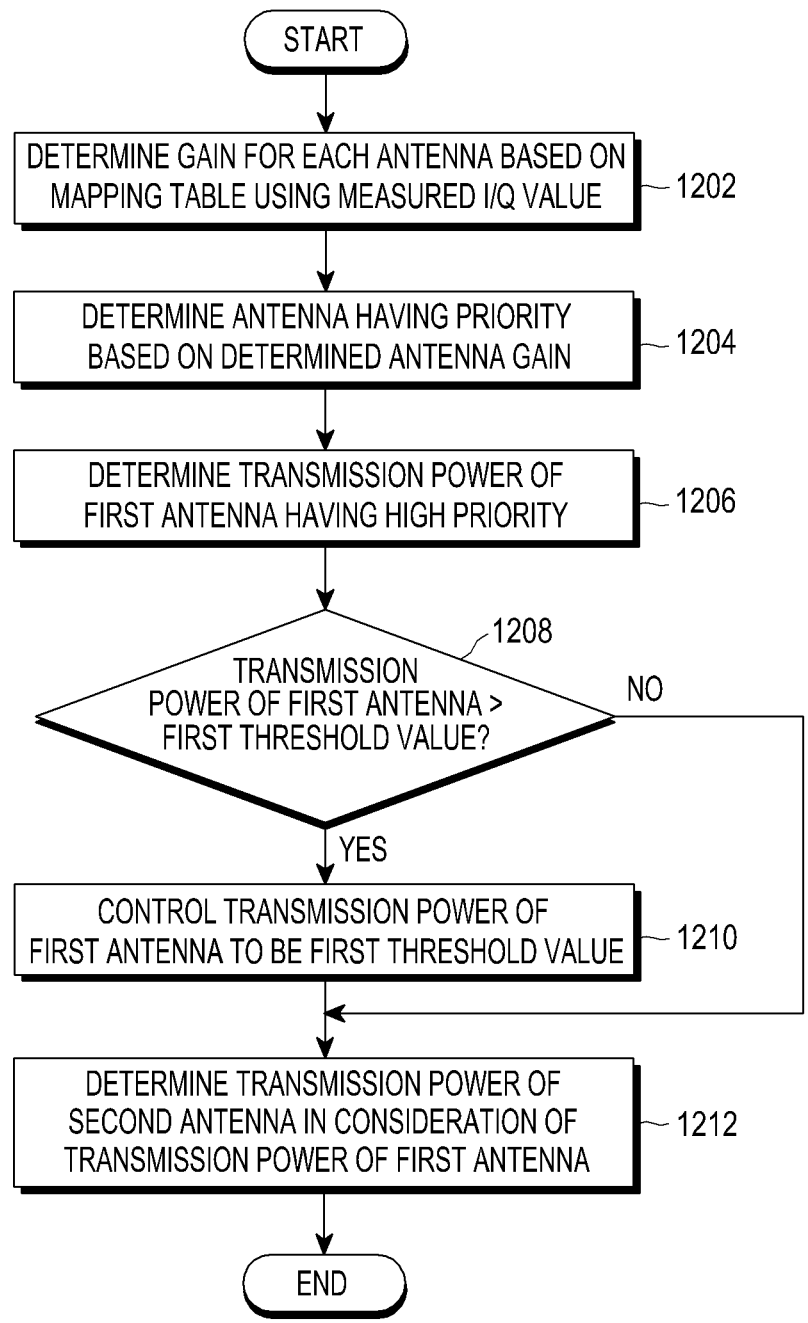
FIG. 12 is a flowchart illustrating a method of controlling transmission diversity power by an electronic device, according to an embodiment.

FIG. 12 is a flowchart illustrating a method of controlling transmission diversity power by an electronic device, according to an embodiment.

Referring to FIG. 12, in operation 1202, an electronic device (for example, the electronic device 100 of FIG. 1 or the electronic device 800 of FIG. 8) determines a gain for each antenna from a mapping table using a measured I/Q value. In operation 1204, the electronic device determines an antenna having a priority from the determined gain for each antenna.

When the first antenna has a relatively better gain state than the second antenna based on the determination result, the first antenna may be determined as the good antenna and a higher priority may be assigned to the first antenna. In operation 1206, the electronic device determines the transmission power of the first antenna having the higher priority.

In operation 1208, the electronic device determines whether the transmission power of the first antenna, determined to be the good antenna, is larger than a first threshold value. When the transmission power of the first antenna is larger than the first threshold value, the electronic device controls the transmission power of the first antenna to be the first threshold value in operation 1210.

In operation 1212, the electronic device determines the transmission power of the second antenna based on the determined transmission power of the first antenna. The electronic device may perform differential transmission power control by differently configuring the transmission power of the first antenna and the transmission power of the second antenna.

Figure 13:
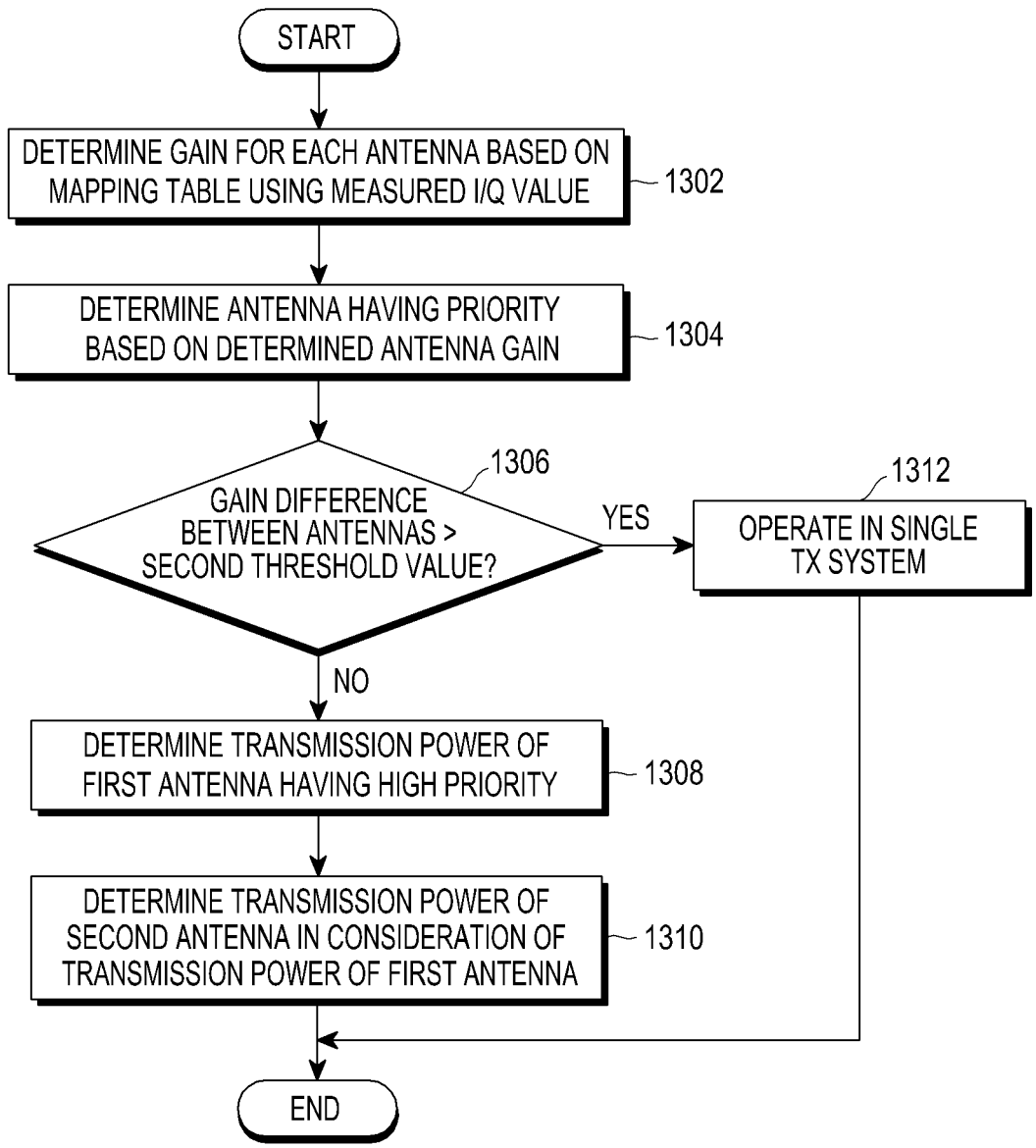
FIG. 13 is a flowchart illustrating a method of controlling transmission diversity power by an electronic device, according to an embodiment.

FIG. 13 is a flowchart illustrating a method of controlling transmission diversity power by an electronic device, according to an embodiment.

Referring to FIG. 13, an electronic device (for example, the electronic device 100 of FIG. 1 or the electronic device 800 of FIG. 8) determines a gain for each antenna from a mapping table using a measured I/Q value in operation 1302. In operation 1304, the electronic device determines which antenna has priority based on the determined gain for each antenna. When the first antenna has a relatively better gain state than the second antenna based on the determination result, the first antenna may be determined to be the good antenna, and a higher priority may be assigned to the first antenna.

The electronic device determines whether the gain difference between the first antenna having the higher priority and the second antenna is larger than a second threshold value in operation 1306.

When the gain difference between the first antenna and the second antenna is larger than the second threshold value, the electronic device operates in a signal transmission system in operation 1312.

When the gain difference between the first antenna and the second antenna is not larger than the second threshold value based on the determination result in operation 1306, the electronic device determines the transmission power of the first antenna having the higher priority in operation 1308.

In operation 1310, the electronic device determines the transmission power of the second antenna based on the determined transmission power of the first antenna. The electronic device may perform differential transmission power control by differently configuring the transmission power of the first antenna and the transmission power of the second antenna.

Figure 14:
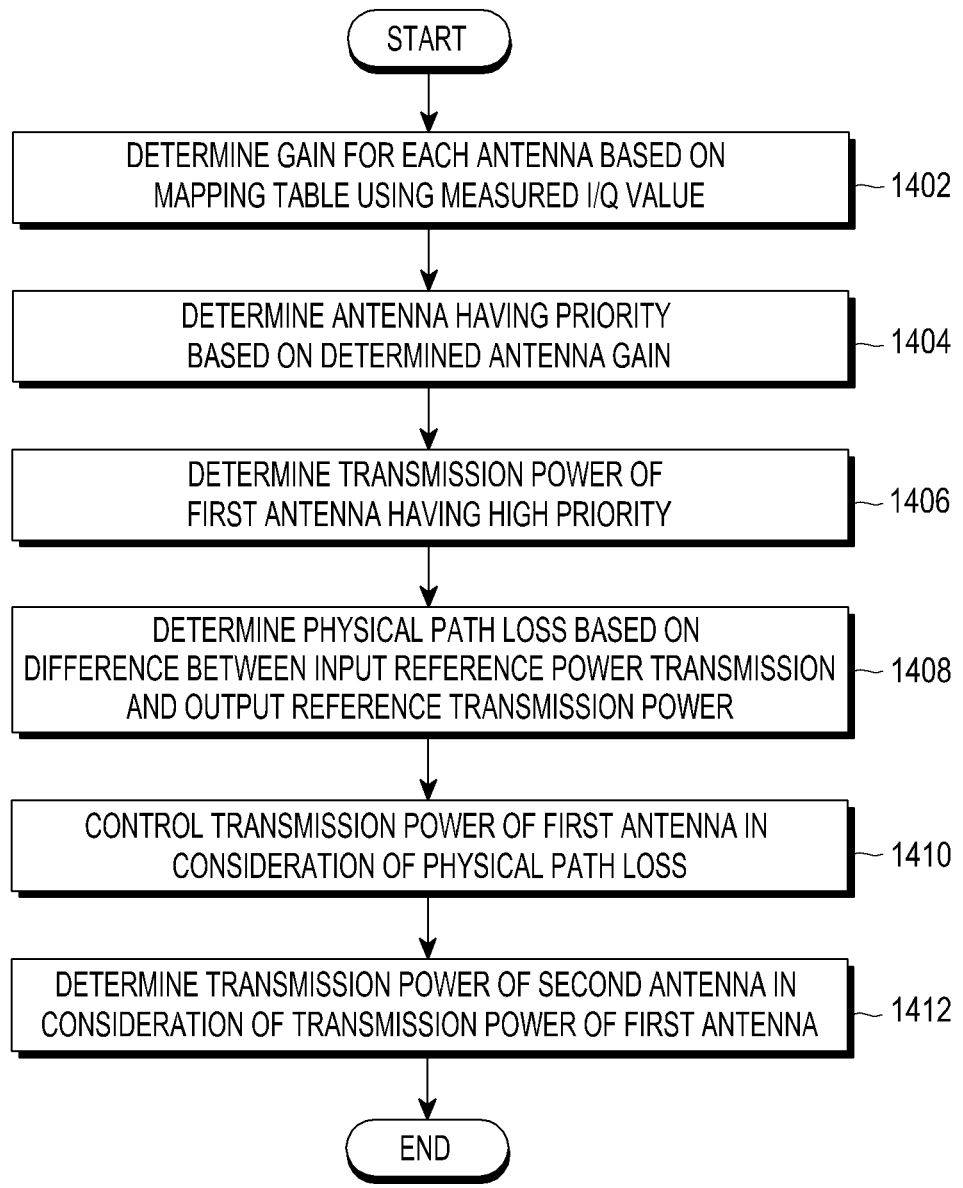
FIG. 14 is a flowchart illustrating a method of controlling transmission diversity power by an electronic device, according to an embodiment.

FIG. 14 is a flowchart illustrating a method of controlling transmission diversity power by an electronic device, according to an embodiment.

Referring to FIG. 14, in operation 1402, an electronic device (for example, the electronic device 100 of FIG. 1 or the electronic device 800 of FIG. 8) determines a gain for each antenna from a mapping table using a measured I/Q value. In operation 1404, the electronic device determines an antenna having a priority from the determined gain for each antenna.

When the first antenna is found to have a relatively better gain state than the second antenna based on the determination result, the electronic device may assign a higher priority to the first antenna. In operation 1406, the electronic device determines the transmission power of the first antenna, having the higher priority.

In operation 1408, the electronic device determines a physical path loss based on a difference between an input reference transmission power and an output reference transmission power. In operation 1410, the electronic device regulates the transmission power of the first antenna based on the physical path loss.

In operation 1412, the electronic device determines the transmission power of the second antenna based on the regulated transmission power of the first antenna. The electronic device may perform differential transmission power control by differently configuring the transmission power of the first antenna and the transmission power of the second antenna.

Figure 15:
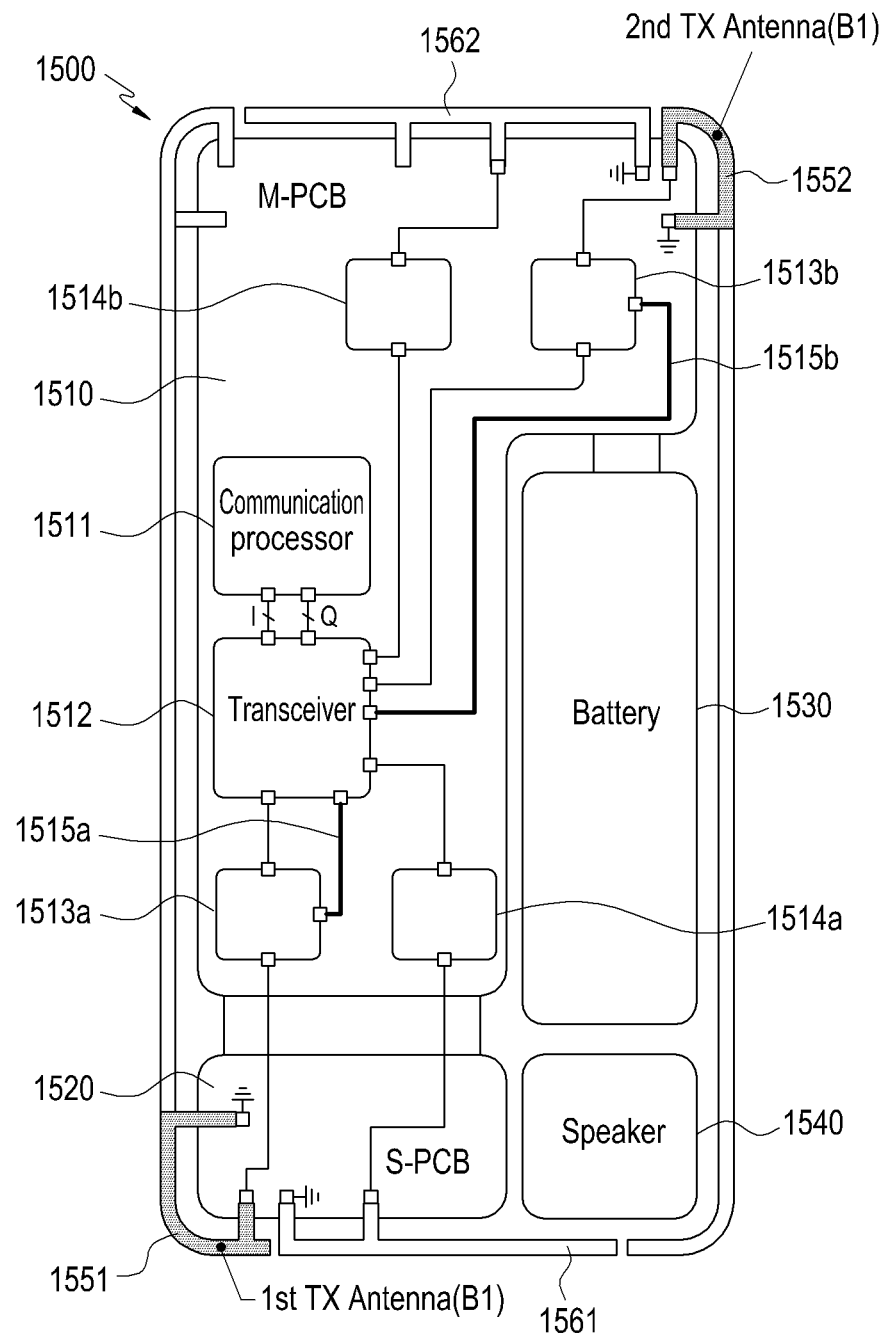
FIG. 15 illustrates the internal configuration of the electronic device, according to an embodiment.
Figure 16:
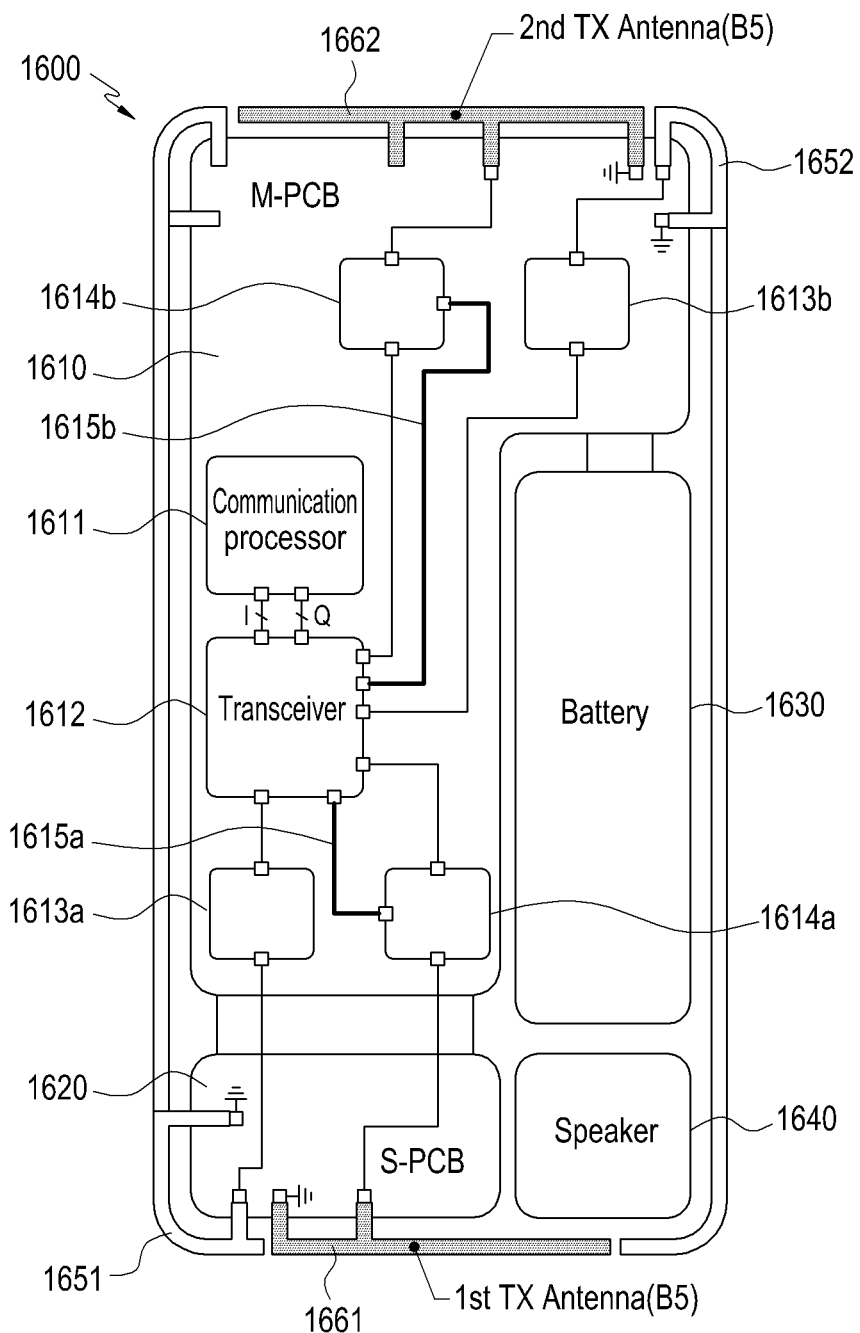
FIG. 16 illustrates the internal configuration of the electronic device, according to an embodiment.

FIGS. 15 and 16 illustrate internal configurations of the electronic device, according to various embodiments. FIG. 15 illustrates an example of the transmission diversity system including a plurality of transmission antennas having a high frequency band (for example, an LTE B1 band), and FIG. 16 illustrates an example of a transmission diversity system including a plurality of transmission antennas having a low frequency band (for example, an LTE B5 band).

Referring to FIGS. 15 and 16, electronic devices 1500 and 1600 include main printed circuit boards (PCBs) 1510 and 1610, sub PCBs 1520 and 1620, batteries 1530 and 1630, and speakers 1540 and 1640. The electronic device 1500 of FIG. 15 or the electronic device 1600 of FIG. 16 may be the same as or similar to the electronic device 100 of FIG. 1 or the electronic device 800 of FIG. 8.

The main PCBs 1510 and 1610 include communication processors 1511 and 1611, transceivers 1512 and 1612, first high-bandwidth transmission/reception circuits 1513*a* and 1613*a*, second high-bandwidth transmission/reception circuits 1513*b* and 1613*b*, first low-bandwidth transmission/reception circuits 1514*a* and 1614*a*, and second low-bandwidth transmission/reception circuits 1514*b* and 1614*b*.

The transmission diversity system may include a plurality of transmission antennas 1551, 1552, 1561, 1562, 1651, 1652, 1661, and 1662. For example, when 4-RX diversity is supported in the LTE system, 4-TX diversity may be supported. Further, four antennas of the antennas included in the housing of FIG. 15 or 16 can be used, and power detectors may be provided within the transceivers 1512 and 1612 corresponding to respective transmission/reception antennas.

The power detector included in the transceiver 1512 of FIG. 15 may receive a reflected signal through a feedback line 1515*a* connected to the first high-bandwidth transmission/reception circuit 1513*a* and a reflected signal through a feedback line 1515*b* connected to the second high-bandwidth transmission/reception circuit 1513*b*.

The power detector included in the transceiver 1612 of FIG. 16 may receive a reflected signal through a feedback line 115*a* connected to the first low-bandwidth transmission/reception circuit 1614*a* and a reflected signal through a feedback line 1615*b* connected to the second low-bandwidth transmission/reception circuit 1614*b*.

The antennas included in the housing may be disposed vertically according to frequency characteristics, and housing antennas having frequency characteristics of similar bands may be symmetrically vertically disposed based on an isolation capability between diversity signals.

Figure 17:
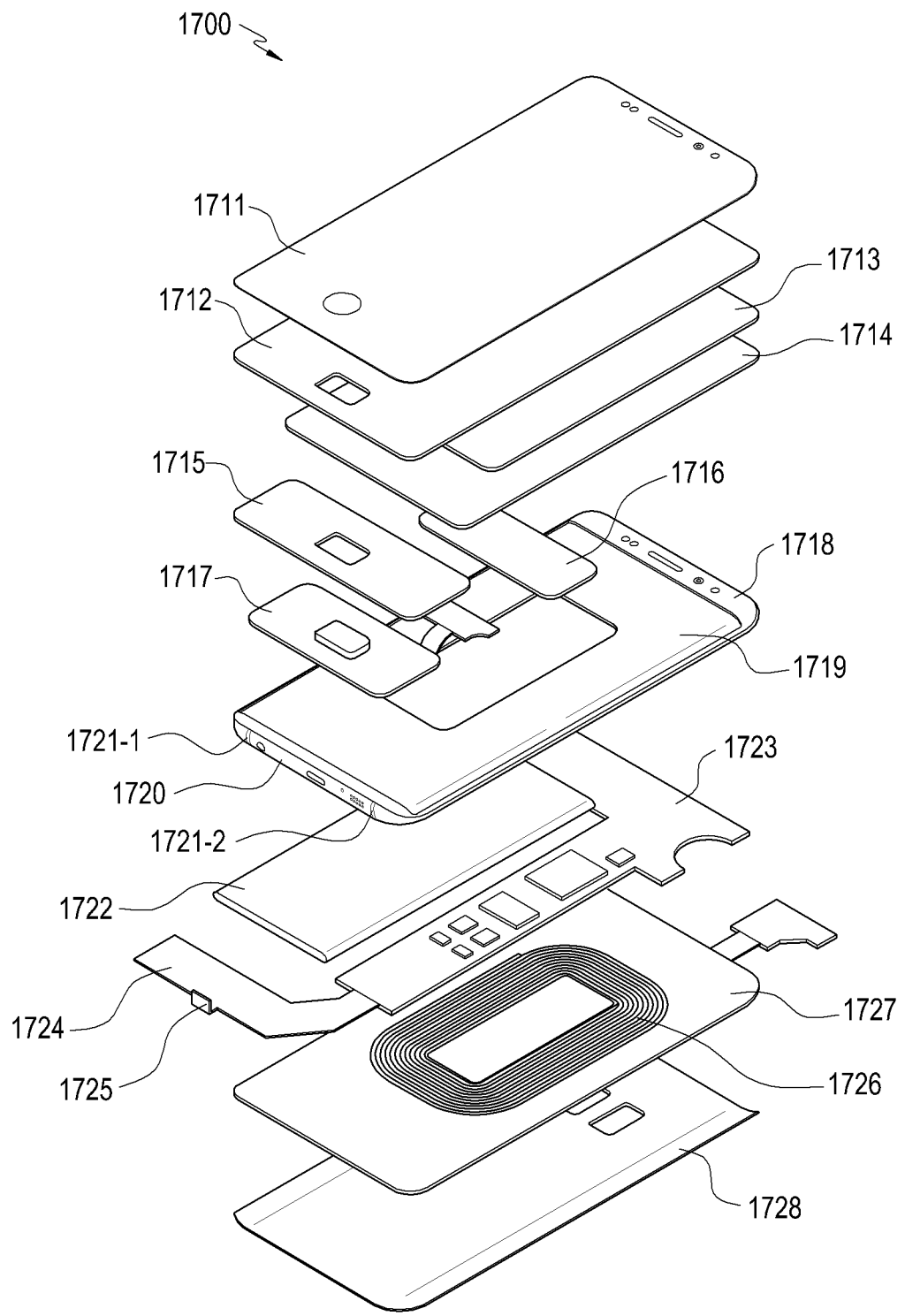
FIG. 17 is an exploded perspective view of the electronic device, according to an embodiment.

FIG. 17 is an exploded perspective view of the electronic device, according to an embodiment.

Referring to FIG. 17, an electronic device 1700 includes a display panel 1711, a digitizer panel 1712, a conductive film 1713, a dielectric 1714, a pressure touch panel 1715, an optical fingerprint sensor 1717, a metal housing 1718, a battery 1722, a main PCB 1723, a sub PCB 1724, a wireless coil 1726, a flexible PCB (FPCB) 1727, and a cover 1728. The electronic device 1700 of FIG. 17 may be the same as or similar to the electronic device 100 of FIG. 1 or the electronic device 800 of FIG. 8.

The display panel 1711 may display a screen according to an aspect ratio determined by a display interface unit. For example, the display panel 1711 may display a user interface according to a floating mode or a split mode and display an application area or a control area through the interface. Control objects (soft key) may be displayed in the control area, and the display may provide various aspect ratios (for example, 18.5:9 (basic) or 21:9). The display may be configured in a form including a window glass and a touch screen panel (TSP). The TSP has a youm on-cell touch active-matrix organic light-emitting diode (AMOLED) (Y-OCTA) structure and may be attached to the display in an add-on cell type.

The digitizer panel 1712 may be configured as a touch sensor and may receive user touch input made on the display. The digitizer panel 1712 may be configured to be the same size as the display and may recognize touch coordinates. For example, the digitizer panel 1712 may configure RX/TX electrodes and may operate in a capacitive manner. For example, the digitizer panel 1712 may configure RX and TX electrodes on a single layer, combine touch information when force input is generated, and use coordinate and time information.

The pressure touch panel 1715 may operate in a capacitive manner and may include RX and TX electrode layers (dual layers). The pressure touch panel 1715 may configure a dielectric 1714 between the RX and TX electrodes to maintain an interval between the electrodes. The pressure touch panel 1715 may generate a change in the interval between the RX and TX electrodes based on the touch pressure, and the capacitive manner may include a self-capacitance manner and a mutual capacitance manner. The electrode configuration may differ according to whether the self-capacitance manner or the mutual capacitance manner is implemented, and may be configured in all or some of the display area. A pressure sensor of the pressure touch panel 1715 may be used as a home key.

The optical fingerprint sensor 1717 may be located under the display, and, when a fingerprint comes into contact therewith, may receive reflected light through a display light source and capture a fingerprint image through the sensor using the reflected light. Further, the optical fingerprint sensor 1717 may perform personal authentication by analyzing the captured image.

The metal housing 1718 may serve to protect the electronic device and may include a housing flat surface 1719 and a housing side surface 1720 on the same plane. The housing flat surface 1719 may include an upper surface and a lower surface, and may include a plurality of slots including a battery swelling slot.

The housing flat surface 1719 and the housing side surface 1720 may be separated or combined by a dielectric, and the housing side surface 1720 may be separated by at least one slit 1721-1 and 1721-2. The display may be mounted to the metal housing 1718 in a first direction (upwards) and the conductive film 1713 and the dielectric 1714 may be disposed between the metal housing 1718 and the display.

The PCBs 1723 and 1724, the battery 1722, and the cover 1728 may be mounted to the metal housing 1718 in a second direction (downwards). The metal housing 1718 may include a housing side surface 1720 exposed to the outside. The surface of the metal housing 1718 may be used as an antenna and may be connected to an RF circuit of the PCBs 1723 and 1724. The surface of the metal housing 1718 may be separated into a plurality of structures by the housing slit 1721-1 or 1721-2. The housing slit 1721-1 or 1721-2 may include a dielectric and may separate the structures of the metal housing 1718.

The PCB may be divided into the main PCB 1723 and the sub PCB 1724, and the main PCB 1723 and the sub PCB 1724 may be electrically connected through a connector. The PCBs 1723 and 1724 may include an RF circuit, and the RF circuit may include RF components such as a communication processor, a transceiver, a power amplifier, a band pass filter, a duplexer, and a diplexer. The PCBs 1723 and 1724 and the housing antenna may be electrically connected through a connection member. The PCB and the connection member of the housing may include a screw and a c-clip. The screw may strongly hold together the PCB and the housing and thus enhance a characteristic of an electrical connection therebetween. For example, the screw may enhance a ground connection (or feeding connection).

The RF circuit connection between the sub PCB 1724 and the main PCB 1723 may be made through a coaxial cable, and the circuit connection between the PCBs other than RF signals may be made through a B-to-B connector. The sub PCB may include an earjack, a USB 1725, a speaker, and an antenna connector.

The conductive film 1713 may make a conductive connection with the ground of the digitizer panel or the display panel. The conductive film 1713 may serve as a noise signal absorption and shielding layer through the ground. The conductive film 1713 may be connected to the dielectric thereunder so as not to be connected to the ground of the housing panel, and may form AC coupling (i.e., capacitive coupling) with the housing panel through the dielectric 1714. The conductive film 1713 may be formed with copper (Cu).

The antenna may use the housing surface exposed to the outside as the antenna structure. One housing structure may constitute an inverted F-antenna, and the inverted F-antenna may be connected to one feeding connection and one ground connection. The one housing structure may be electrically connected to the PCB through the connection member, and one end of the one structure may be connected to the feeding connection or the ground connection. For example, when one end is the feeding connection, the ground connection may be connected to the center of the structure. When one end is the ground connection, the feeding connection may be connected to the center of the structure.

Figure 18:
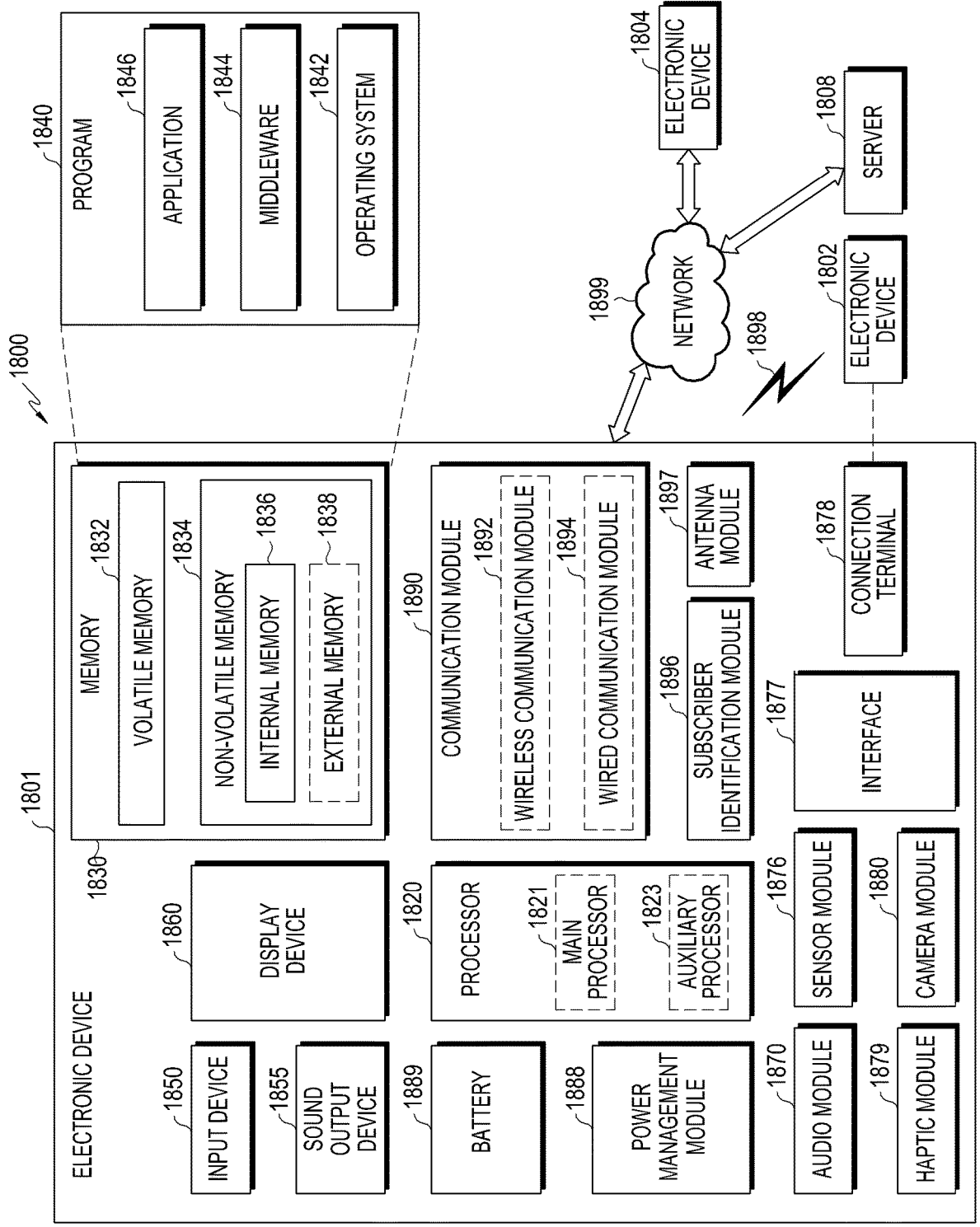
FIG. 18 illustrates the electronic device within a network environment, according to an embodiment.

FIG. 18 is a block diagram illustrating an electronic device 1801 (for example, the electronic device 100 of FIG. 1) within a network environment 1800, according to various embodiments.

Referring to FIG. 18, the electronic device 1801 in the network environment 1800 may communicate with an electronic device 1802 via a first network 1898 (e.g., a short-range wireless communication network), or an electronic device 1804 or a server 1808 via a second network 1899 (e.g., a long-distance wireless communication network). According to an embodiment, the electronic device 1801 may communicate with the electronic device 1804 via the server 1808. According to an embodiment, the electronic device 1801 may include a processor 1820, a memory 1830, an input device 1850, a sound output device 1855, a display device 1860, an audio module 1870, a sensor module 1876, an interface 1877, a haptic module 1879, a camera module 1880, a power management module 1888, a battery 1889, a communication module 1890, a subscriber identification module (SIM) 1896, and an antenna module 1897. In some embodiments, at least one (e.g., the display device 1860 or the camera module 1880) of the components may be omitted from the electronic device 1801, or one or more other components may be added to the electronic device 1801. In some embodiments, some of the components may be implemented as a single integrated circuitry. For example, the sensor module 1876 (e.g., a fingerprint sensor, an iris sensor, or an illumination sensor) may be implemented as embedded in the display device 1860 (e.g., a display).

The processor 1820 may execute, for example, software (e.g., a program 1840) to control at least one other component (e.g., a hardware or software component) of the electronic device 1801 coupled with the processor 1820, and may perform various data processing or computation. According to one embodiment, as at least part of the data processing or computation, the processor 1820 may load a command or data received from another component (e.g., the sensor module 1876 or the communication module 1890) in volatile memory 1832, process the command or the data stored in the volatile memory 1832, and store resulting data in non-volatile memory 1834. According to an embodiment, the processor 1820 may include a main processor 1821 (e.g., a CPU or an AP), and an auxiliary processor 1823 (e.g., a graphics processing unit (GPU), an image signal processor (ISP), a sensor hub processor, or a communication processor (CP)) that is operable independently from, or in conjunction with, the main processor 1821. Additionally or alternatively, the auxiliary processor 1823 may be adapted to consume less power than the main processor 1821, or to be specific to a specified function. The auxiliary processor 1823 may be implemented as separate from, or as part of the main processor 1821.

The auxiliary processor 1823 may control at least some of functions or states related to at least one component (e.g., the display device 1860, the sensor module 1876, or the communication module 1890) among the components of the electronic device 1801, instead of the main processor 1821 while the main processor 1821 is in an inactive (e.g., sleep) state, or together with the main processor 1821 while the main processor 1821 is in an active state (e.g., executing an application). According to an embodiment, the auxiliary processor 1823 (e.g., an image signal processor or a communication processor) may be implemented as part of another component (e.g., the camera module 1880 or the communication module 1890) functionally related to the auxiliary processor 1823.

The memory 1830 may store various data used by at least one component (e.g., the processor 1820 or the sensor module 1876) of the electronic device 1801. The various data may include, for example, software (e.g., the program 1840) and input data or output data for a command related thereto. The memory 1830 may include the volatile memory 1832 or the non-volatile memory 1834.

The program 1840 may be stored in the memory 1830 as software, and may include, for example, an operating system (OS) 1842, middleware 1844, or an application 1846.

The input device 1850 may receive a command or data to be used by other component (e.g., the processor 1820) of the electronic device 1801, from the outside (e.g., a user) of the electronic device 1801. The input device 1850 may include, for example, a microphone, a mouse, a keyboard, or a digital pen (e.g., a stylus pen).

The sound output device 1855 may output sound signals to the outside of the electronic device 1801. The sound output device 1855 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1860 may visually provide information to the outside (e.g., a user) of the electronic device 1801. The display device 1860 may include, for example, a display, a hologram device, or a projector and control circuit to control a corresponding one of the display, hologram device, and projector. According to an embodiment, the display device 1860 may include touch circuitry adapted to detect a touch, or sensor circuitry (e.g., a pressure sensor) adapted to measure the intensity of force incurred by the touch.

The audio module 1870 may convert a sound and an electrical signal and vice versa. According to an embodiment, the audio module 1870 may obtain the sound via the input device 1850, or output the sound via the sound output device 1855 or a headphone or an external electronic device (e.g., an electronic device 1802) directly (e.g., wiredly) or wirelessly coupled with the electronic device 1801.

The sensor module 1876 may detect an operational state (e.g., power or temperature) of the electronic device 1801 or an environmental state (e.g., a state of a user) external to the electronic device 1801, and then generate an electrical signal or data value corresponding to the detected state. According to an embodiment, the sensor module 1876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The interface 1877 may support one or more specified protocols to be used for the electronic device 1801 to be coupled with the external electronic device (e.g., the electronic device 1802) directly (e.g., wiredly) or wirelessly. According to an embodiment, the interface 1877 may include, for example, a high-definition multimedia interface (HDMI), a universal serial bus (USB) interface, a secure digital (SD) card interface, or an audio interface.

A connecting terminal 1878 may include a connector via which the electronic device 1801 may be physically connected with an external electronic device (e.g., the electronic device 1802). According to an embodiment, the connecting terminal 1878 may include, for example, a HDMI connector, a USB connector, a SD card connector, or an audio connector (e.g., a headphone connector).

The haptic module 1879 may convert an electric signal into a mechanical stimulus (e.g., a vibration or a movement) or electric stimulation which may be recognized by a user via his tactile sensation or kinesthetic sensation. According to an embodiment, the haptic module 1879 may include, for example, a motor, a piezoelectric element, or an electrostimulator.

The camera module 1880 may capture a still image or moving images. According to an embodiment, the camera module 1880 may include one or more lenses, image sensors, image signal processors, or flashes.

The power management module 1888 may manage power supplied to the electronic device 1801. According to an embodiment, the power management module 1888 may be implemented as at least part of, for example, a power management integrated circuit (PMIC).

The battery 1889 may supply power to at least one component of the electronic device 1801. According to an embodiment, the battery 1889 may include, for example, a primary cell which is not rechargeable, a secondary cell which is rechargeable, or a fuel cell.

The communication module 1890 may support establishing a direct (e.g., wired) communication channel or a wireless communication channel between the electronic device 1801 and the external electronic device (e.g., the electronic device 1802, the electronic device 1804, or the server 1808) and performing communication via the established communication channel. The communication module 1890 may include one or more communication processors that are operable independently from the processor 1820 (e.g., the AP) and supports a direct (e.g., wired) communication or a wireless communication. According to an embodiment, the communication module 1890 may include a wireless communication module 1892 (e.g., a cellular communication module, a short-range wireless communication module, or a global navigation satellite system (GNSS) communication module) or a wired communication module 1894 (e.g., a local area network (LAN) communication module or a power-line communication module). A corresponding one of these communication modules may communicate with an external electronic device via the first network 1898 (e.g., a short-range communication network such as Bluetooth™, wireless-fidelity (Wi-Fi) direct, or infrared data association (IrDA)) or a second network 1899 (e.g., a long-distance communication network such as a cellular network, the Internet, or a computer network (e.g., a LAN or a WAN)). These various types of communication modules may be implemented as a single component (e.g., a single chip), or may be implemented as multi components (e.g., multi chips) separate from each other. The wireless communication module 1892 may identify and authenticate the electronic device 1801 in a communication network, such as the first network 1898 or the second network 1899, using subscriber information (e.g., international mobile subscriber identity (IMSI)) stored in the subscriber identification module #96.

The antenna module 1897 may transmit or receive a signal or power to or from the outside (e.g., the external electronic device) of the electronic device 1801. According to an embodiment, the antenna module 1897 may include an antenna including a radiating element composed of a conductive material or a conductive pattern formed in or on a substrated (e.g., PCB). According to an embodiment, the antenna module 1897 may include a plurality of antennas. In such a case, at least one antenna appropriate for a communication scheme used in the communication network, such as the first network 1898 or the second network 1899, may be selected, for example, by the communication module 1890 (e.g., the wireless communication module 1892) from the plurality of antennas. The signal or the power may then be transmitted or received between the communication module 1890 and the external electronic device via the selected at least one antenna. According to an embodiment, another component (e.g., a radio frequency integrated circuit (RFIC)) other than the radiating element may be additionally formed as part of the antenna module 1897.

A least some of the above-described components may be couple mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1801 and the external electronic device 1804 via the server 1808 coupled with the second network 1899. Each of the electronic devices 1802 and 1804 may be a device of a same type as, or a different type, from the electronic device 1801.

According to an embodiment, all or some of operations to be executed at the electronic device 1801 may be executed at one or more of the external electronic devices 1802, 1804, or 1808. For example, if the electronic device 1801 should perform a function or a service automatically, or in response to a request from a user or another device, the electronic device 1801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1801. The electronic device 1801 may provide the received result as it is, or may additionally process the received result to provide the requested functions or services. To this end, for example, cloud-computing, distributed-computing, or cient-server-computing technology may be used.

The above described components of the electronic device according to various embodiments may be formed of one or more components, and a name of a corresponding component element may be changed based on the type of electronic device. The electronic device according to various embodiments may include at least one of the aforementioned elements. Some elements may be omitted or other additional elements may be further included in the electronic device. Also, some of the hardware components according to various embodiments may be combined into one entity, which may perform functions identical to those of the components before the combination.

According to various embodiments, at least some of the devices (for example, modules or functions thereof) or the method (for example, operations) according to the present disclosure may be implemented by a instruction stored in a computer-readable storage medium in a programming module form. The instruction, when executed by a processor (e.g., the processor 120), may cause the one or more processors to execute the function corresponding to the instruction. The computer-readable storage medium may be, for example, the memory 260.

The computer readable recoding medium may include a hard disk, a floppy disk, magnetic media (e.g., a magnetic tape), optical media (e.g., a compact disc read only memory (CD-ROM) and a DVD), magneto-optical media (e.g., a floptical disk), and a hardware device (e.g., a read only memory (ROM), a random access memory (RAM), a flash memory). In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments may be executed sequentially, in parallel, repeatedly, or in a heuristic manner. Furthermore, some operations may be executed in a different order or may be omitted, or other operations may be added.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device comprising:
a housing;
a first antenna located at a first part of the housing;
a second antenna located at a second part of the housing;
a transceiver configured to generate a first signal and a second signal;
a first coupler electrically connected between the first antenna and the transceiver and configured to receive the first signal from the transceiver and provide the received first signal to the first antenna;
a second coupler electrically connected to the second antenna and the transceiver and configured to receive the second signal from the transceiver and provide the received second signal to the second antenna;
a first power amplifier electrically connected between the first coupler and the transceiver;
a second power amplifier electrically connected between the second coupler and the transceiver, and
a control circuit operationally connected to the transceiver,
wherein the control circuit is configured to:
obtain first data, based on a first feed back signal of the first signal fed back by the first coupler, wherein the first signal has a reference power,
obtain second data, based on a second feed back signal of the second signal fed back by the second coupler, wherein the second signal has the reference power,
determine a first gain of the first antenna and a second gain of the second antenna, based on the first data and the second data,
determine whether the first gain is higher than the second gain, and
based on the first gain being higher than the second gain and a difference between the first gain and the second gain:
control the first power amplifier such that the first signal has an increased transmission power, a magnitude of the increased transmission power being greater than a magnitude of the reference power,
control the first antenna to output the first signal having the increased transmission power,
control the second power amplifier such that the second signal has a reduced transmission power, a magnitude of the reduced transmission power being greater than the magnitude of the reference power, and
control the second antenna to output the second signal having the reduced transmission power.

2. The electronic device of claim 1, further comprising a communication processor including the control circuit.

3. The electronic device of claim 1, wherein the housing includes a front plate, a rear plate facing a direction opposite the front plate, and a side member surrounding a space between the front place and the rear plate, and the side member includes a first conductive portion provided as the first antenna and a second conductive portion provided as the second antenna.

4. The electronic device of claim 1, wherein the control circuit is further configured to control the transceiver to generate the first signal and the second signal in order to provide transmission diversity.

5. The electronic device of claim 4, wherein the first signal and the second signal are primary carrier component (PCC) signals of an identical frequency.

6. The electronic device of claim 1, wherein the control circuit is further configured to determine whether the first antenna or the second antenna has a priority, based on the first gain and the second gain.

7. The electronic device of claim 1, wherein the first data includes a first in-phase/quadrature-phase (I/Q) value which is measured based on the first feed back signal, and
wherein the second data includes a second I/Q value which is measured based on the second feed back signal.

8. The electronic device of claim 7, wherein the control circuit is further configured to obtain the first data and the second data through a mapping table.

9. The electronic device of claim 1, wherein the increased transmission power is determined by adding a value corresponding to the difference to the reference power, and the reduced transmission power is determined by subtracting the increased transmission power from a target transmission power.

10. A method of controlling transmission diversity power by an electronic device, the method comprising:
receiving a first signal having a reference power from a transceiver of the electronic device and providing the received first signal to a first antenna of the electronic device, by a first coupler of the electronic device electrically connected between the first antenna and the transceiver;
receiving a second signal having the reference power from the transceiver and providing the received second signal to a second antenna of the electronic device, by a second coupler of the electronic device electrically connected between the second antenna and the transceiver;
obtaining, by a control circuit of the electronic device, first data, based on a first feed back signal of the first signal fed back by the first coupler;
obtaining, by the control circuit, second data, based on a second feed back signal of the second signal fed back by the second coupler;
determining, by the control circuit, a first gain of the first antenna and a second gain of the second antenna, based on the first data and the second data;
determining, by the control circuit, whether the first gain is higher than the second gain; and
based on the first gain being higher than the second gain and a difference between the first gain and the second gain:
controlling, by the control circuit, a first power amplifier connected between the first coupler and the transceiver such that the first signal has an increased transmission power, a magnitude of the increased transmission power being greater than a magnitude of the reference power,
controlling, by the control circuit, the first antenna to output the first signal having an increased transmission power,
control, by the control circuit, a second power amplifier connected between the second coupler and the transceiver such that the second signal has a reduced transmission power, a magnitude of the reduced transmission power being greater than the magnitude of the reference power, and controlling, by the control circuit, the second antenna to output the second signal having a reduced transmission power.

11. The method of claim 10, further comprising controlling the transceiver to generate the first signal and the second signal in order to provide transmission diversity.

12. The method of claim 11, wherein the first signal and the second signal are primary carrier component (PCC) signals of an identical frequency.

13. The method of claim 10, further comprising:
   determining whether the first antenna or the second antenna has a priority, based on the first gain and the second gain.

14. The method of claim 10, wherein the first data includes a first in-phase/quadrature-phase (I/Q) value which is measured based on the first feed back signal and the second data includes a second I/Q value which is measured based on the second feed back signal.

15. The method of claim 14, further comprising obtaining the first data and the second data through a mapping table.

16. The method of claim 10, wherein the increased transmission power is determined by adding a value corresponding to the difference to the reference power, and the reduced transmission power is determined by subtracting the increased transmission power from a target transmission power.

17. The method of claim 10, wherein providing the first signal to the first antenna and providing the second signal to the second antenna comprises providing the first signal and the second signal to the first antenna and the second antenna, respectively, when the electronic device performs a random-access procedure with a base station.

18. The method of claim 17, wherein the reference transmission power is determined based on a transmission power parameter received from the base station.

19. The method of claim 17, wherein the reference transmission power corresponds to a physical random access channel (PRACH) preamble transmission signal.

* * * * *